United States Patent
Peng et al.

(10) Patent No.: US 12,345,793 B2
(45) Date of Patent: Jul. 1, 2025

(54) USING DOPPLER FOR MULTIPATH DETECTION AND MITIGATION IN RF-BASED POSITIONING

(71) Applicant: QUALCOMM Incorporated, San Diego, CA (US)

(72) Inventors: Yuxiang Peng, Sunnyvale, CA (US); Ning Luo, Cupertino, CA (US); Bo Zheng, Sunnyvale, CA (US); Jingchao Bao, San Diego, CA (US); Min Wang, Tustin, CA (US); Gengsheng Zhang, Cupertino, CA (US); Yinghua Yang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/809,533

(22) Filed: Jun. 28, 2022

(65) Prior Publication Data

US 2023/0417855 A1    Dec. 28, 2023

(51) Int. Cl.
| | |
|---|---|
| G01S 1/38 | (2006.01) |
| G01S 19/22 | (2010.01) |
| G01S 19/37 | (2010.01) |
| H04W 64/00 | (2009.01) |

(52) U.S. Cl.
CPC ............... *G01S 1/38* (2013.01); *G01S 19/22* (2013.01); *G01S 19/37* (2013.01); *H04W 64/00* (2013.01)

(58) Field of Classification Search
CPC .. H04L 12/122; H04W 40/20; H04W 52/283; G01S 1/38; G01S 1/763; G01S 3/8022
See application file for complete search history.

(56) References Cited

U.S. PATENT DOCUMENTS

| | | | | |
|---|---|---|---|---|
| 2017/0238141 | A1* | 8/2017 | Lindoff | H04B 7/0834 |
| | | | | 455/456.5 |
| 2018/0011200 | A1* | 1/2018 | Ramamurthy | G01S 19/20 |
| 2021/0333411 | A1* | 10/2021 | Gum | G01S 19/21 |

(Continued)

FOREIGN PATENT DOCUMENTS

| | | |
|---|---|---|
| EP | 3940427 A1 | 1/2022 |
| WO | 2018009281 A1 | 1/2018 |

OTHER PUBLICATIONS

Ali P., "GNSS Signal and Measurement Quality Monitoring for Multipath Detection and Mitigation", Aug. 1, 2019, XP055839978, Calgary, Canada, 30 Pages, p. 9-10, Section 4.2.

(Continued)

*Primary Examiner* — Shukri Taha
(74) *Attorney, Agent, or Firm* — Thien T. Nguyen

(57) ABSTRACT

Aspects presented herein may improve the performance and accuracy of RF-based positioning. Aspects presented herein may enable a device to use RF Doppler measurements to detect and mitigate multipath effects in RF-based positioning. The RF-based positioning may include satellite navigation, terrestrial positioning system, and/or indoor positioning. In one aspect, a UE receives, via a receiver, signals from one or more entities. The UE determines whether each received signal is a multipath signal based on a Doppler shift measurement. The UE de-weights or excludes one or more signals of the received signals in estimating a position of the UE based on whether the respective received signal is determined to be a multipath signal.

19 Claims, 14 Drawing Sheets

(56) References Cited

U.S. PATENT DOCUMENTS

2022/0268872 A1* 8/2022 Barbu .................... H04W 4/02
2022/0390618 A1* 12/2022 Lavi ........................ G01S 19/41

OTHER PUBLICATIONS

International Search Report and Written Opinion—PCT/US2023/019870—ISA/EPO—Aug. 25, 2023.

Xu L., et al., "NLOS and Multipath Detection using Doppler Shift Measurements", GNSS 2019—Proceedings of The 32nd International Technical Meeting of the Satellite Division of the Institute of Navigation (ION GNSS+ 2019), The Institute of Navigation, 8551 Rixlew Lane Suite 360 Manassas, VA 20109, USA, Sep. 20, 2019, XP056015707, pp. 4064-4075, figure 1, pp. 4065-4069, sections: "Multipath Effect on FLL", "Multipath Detector" and "Data Collection and Processing".

\* cited by examiner

USING DOPPLER FOR MULTIPATH DETECTION AND MITIGATION IN RF-BASED POSITIONING

TECHNICAL FIELD

The present disclosure relates generally to positioning systems, and more particularly, to positioning systems involving radio frequency (RF) based positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, via a receiver, signals from one or more entities. The apparatus determines whether each received signal is a multipath signal based on a Doppler shift measurement. The apparatus de-weights or excludes one or more signals of the received signals in estimating a position of the UE based on whether the respective received signal is determined to be a multipath signal.

In an aspect of the disclosure, a method, a computer-readable medium, and an apparatus are provided. The apparatus receives, via a receiver, signals from one or more entities. The apparatus determines whether each received signal is a multipath signal based on a Doppler shift measurement. The apparatus transmits, via a transmitter, measurement information associated with one or more signals of the received signals, the measurement information indicating at least in part whether each of the one or more signals is a multipath signal.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
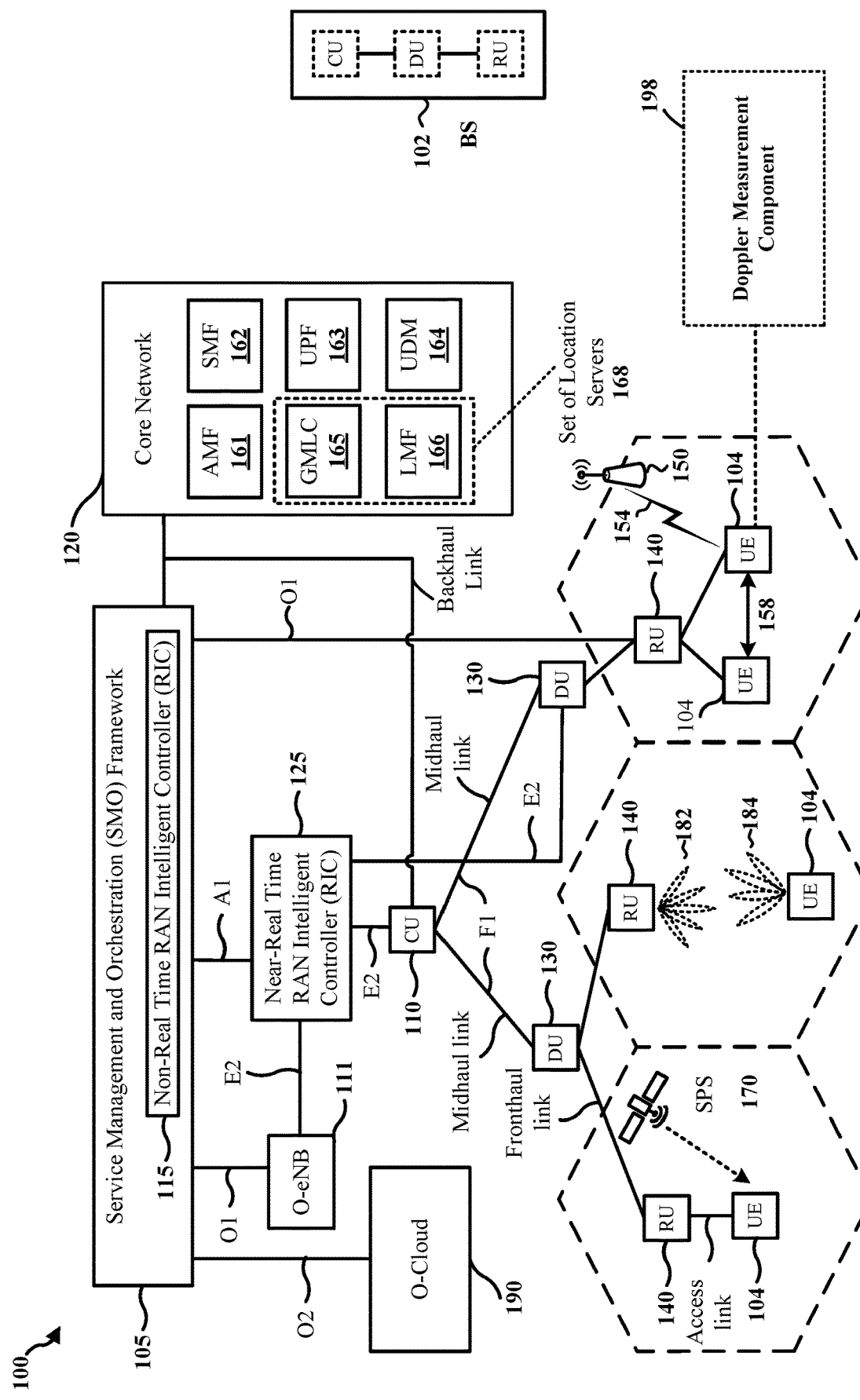
FIG. 1 is a diagram illustrating an example of a wireless communications system and an access network.

Aspects presented herein may improve the performance and accuracy of RF-based positioning. Aspects presented herein may enable a device to use RF Doppler measurements to detect and mitigate multipath effects in RF-based positioning. The RF-based positioning may include satellite navigation (e.g., GNSS, low Earth orbit (LEO) satellite, etc.), terrestrial positioning system (e.g., network-based positioning associated with 5G NR, 4G LTE, etc.), and/or indoor positioning (e.g., Wi-Fi based positioning, Ultra-wideband (UWB) positioning, Bluetooth positioning, etc.). As Doppler measurements may be ubiquitous in most RF-based systems and may not specify additional hardware infrastructure, aspects presented herein may apply to a wide range of RF-based positioning technologies.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a Doppler measurement component 198 configured to measure Dopplers for signals received from a plurality of transmitters (e.g., SVs, base stations, TRPs, etc.). In one configuration, the Doppler measurement component 198 may be configured to receive, via a receiver, signals from one or more entities. In such configuration, the Doppler measurement component 198 may determine whether each received signal is a multipath signal based on a Doppler shift measurement. In such configuration, the Doppler measurement component 198 may de-weight or exclude one or more signals of the received signals in estimating a position of the UE based on whether the respective received signal is determined to be a multipath signal.

In another configuration, the Doppler measurement component 198 may be configured to receive, via a receiver, signals from one or more entities. In such configuration, the Doppler measurement component 198 may determine whether each received signal is a multipath signal based on a Doppler shift measurement. In such configuration, the Doppler measurement component 198 may transmit, via a transmitter, measurement information associated with one or more signals of the received signals, the measurement information indicating at least in part whether each of the one or more signals is a multipath signal.

Figure 2:
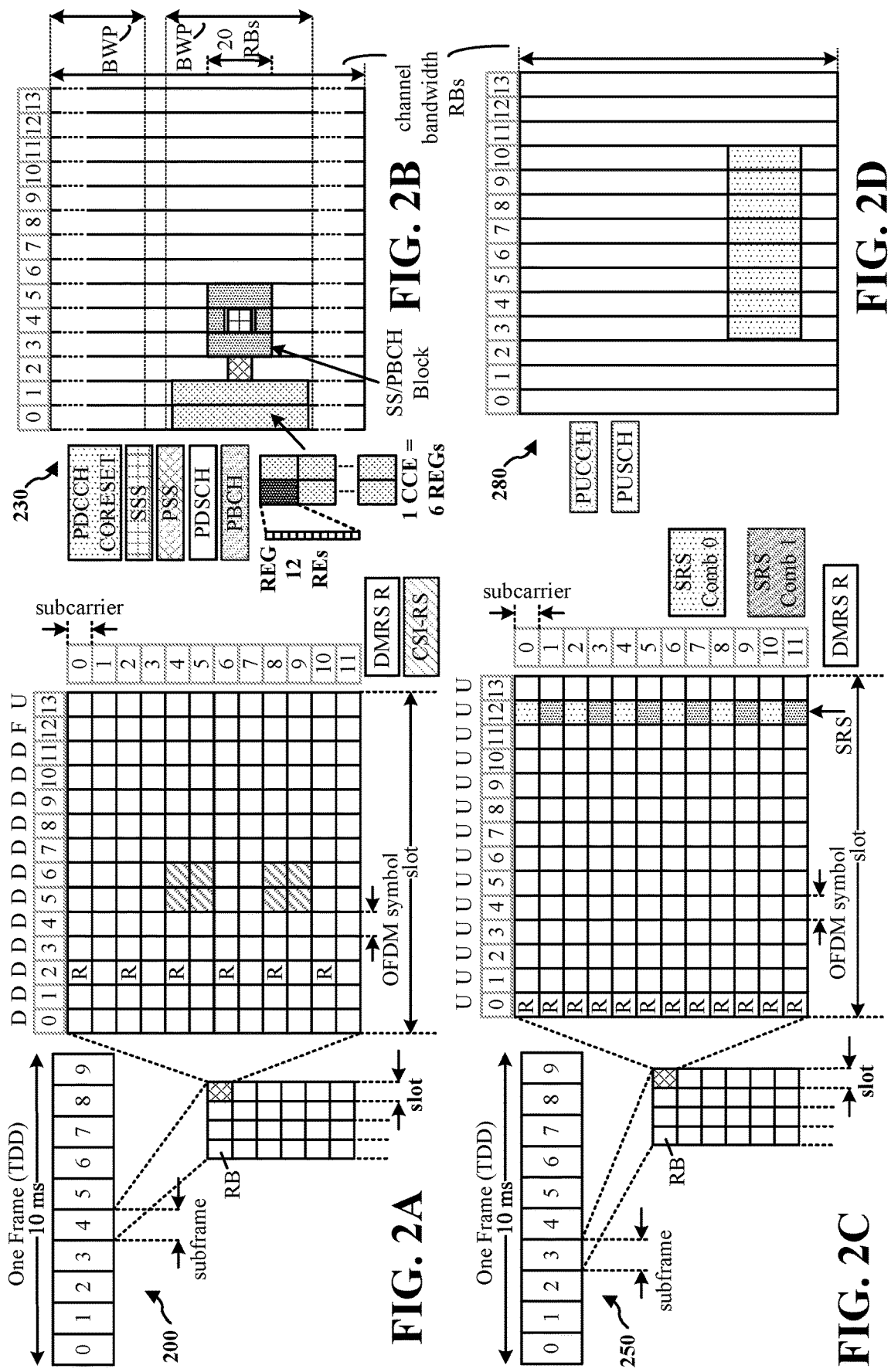
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
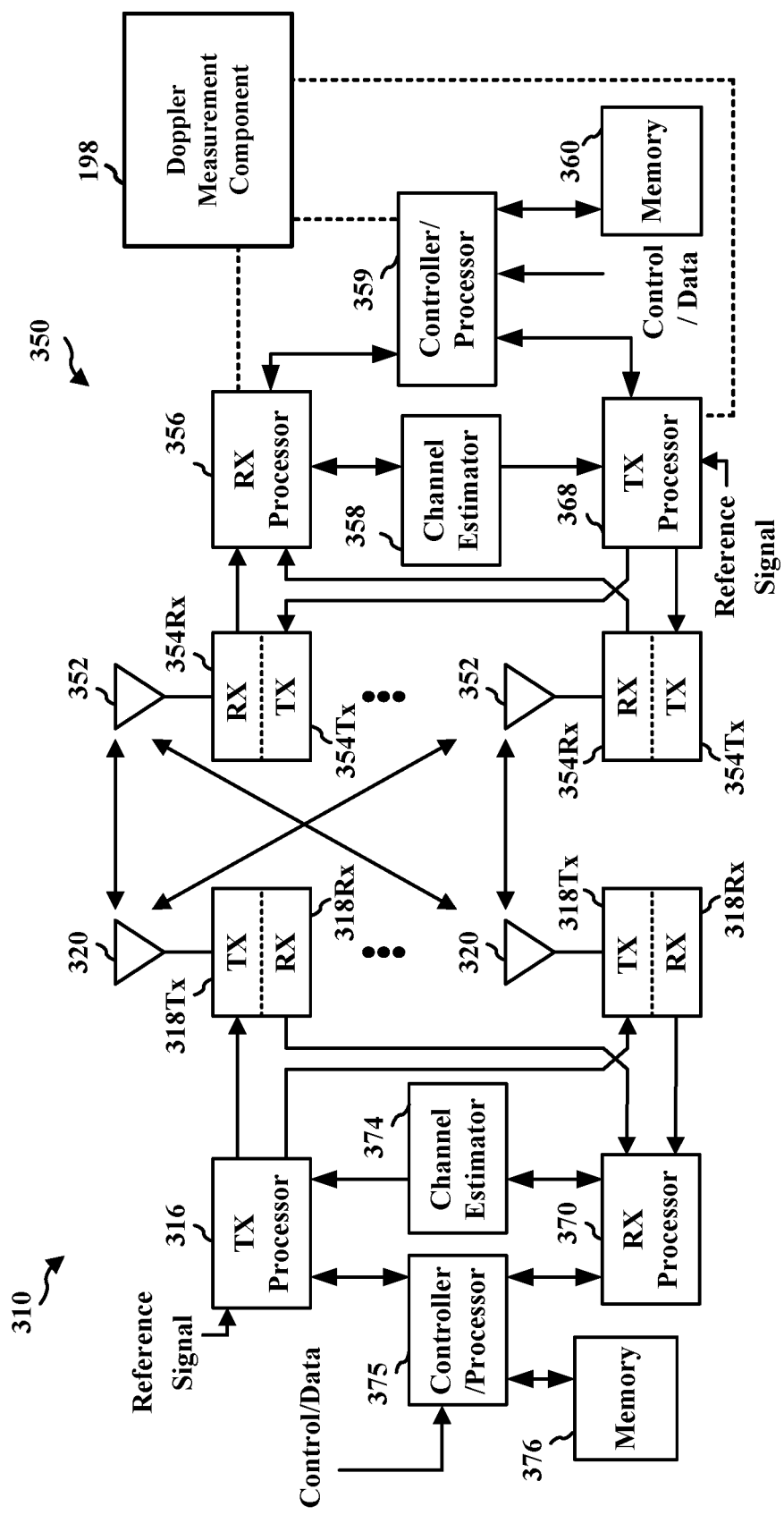
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the Doppler measurement component 198 of FIG. 1.

Figure 4:
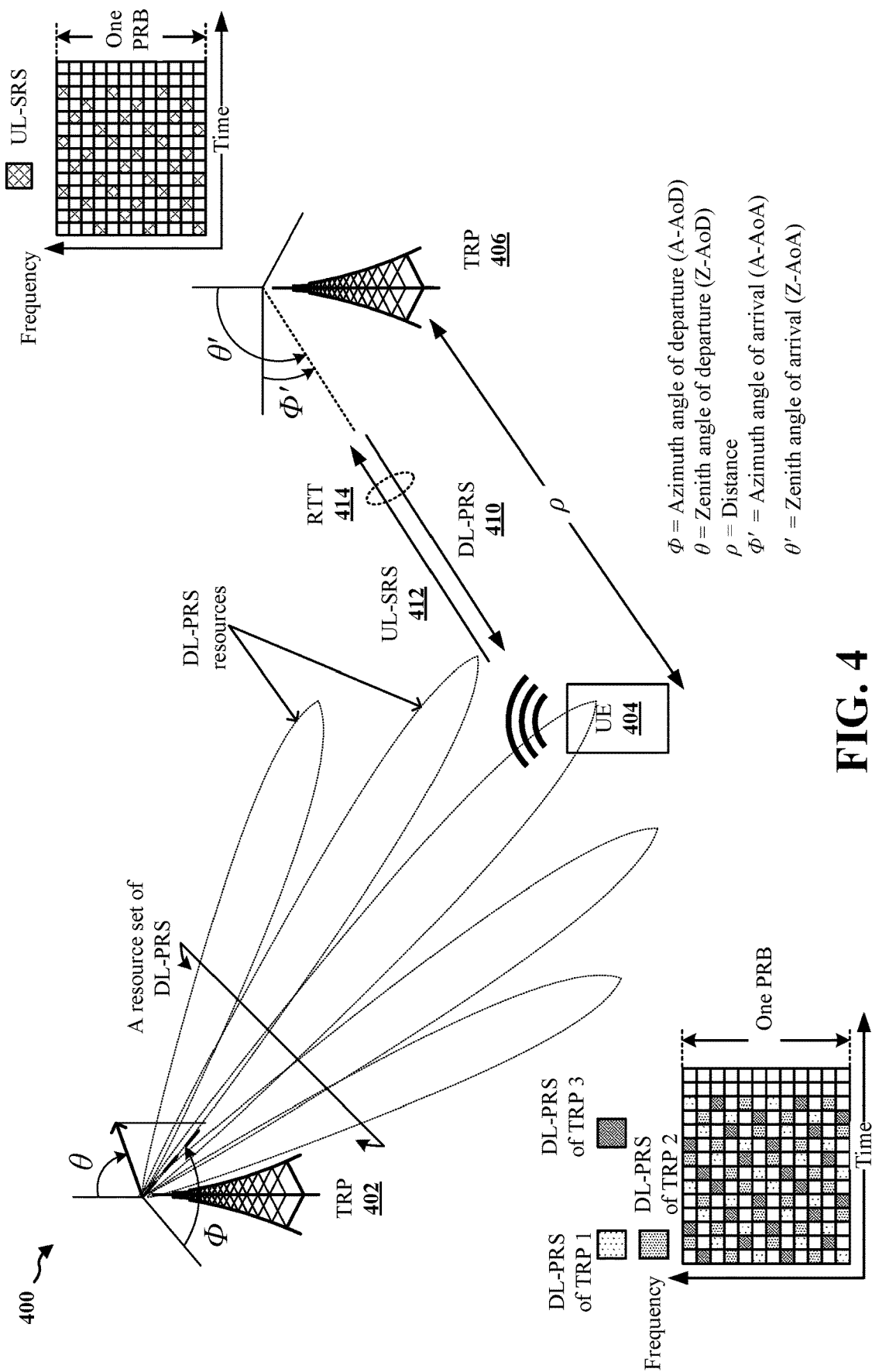
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A device equipped with a global navigation satellite system (GNSS) receiver may determine its location based on GNSS positioning. GNSS is a network of satellites broadcasting timing and orbital information used for navigation and positioning measurements. GNSS may include multiple groups of satellites, known as constellations, that broadcast signals (which may be referred to as GNSS signals) to control stations and users of GNSS. Based on the broadcast signals, the users may be able to determine their locations (e.g., via trilateration). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
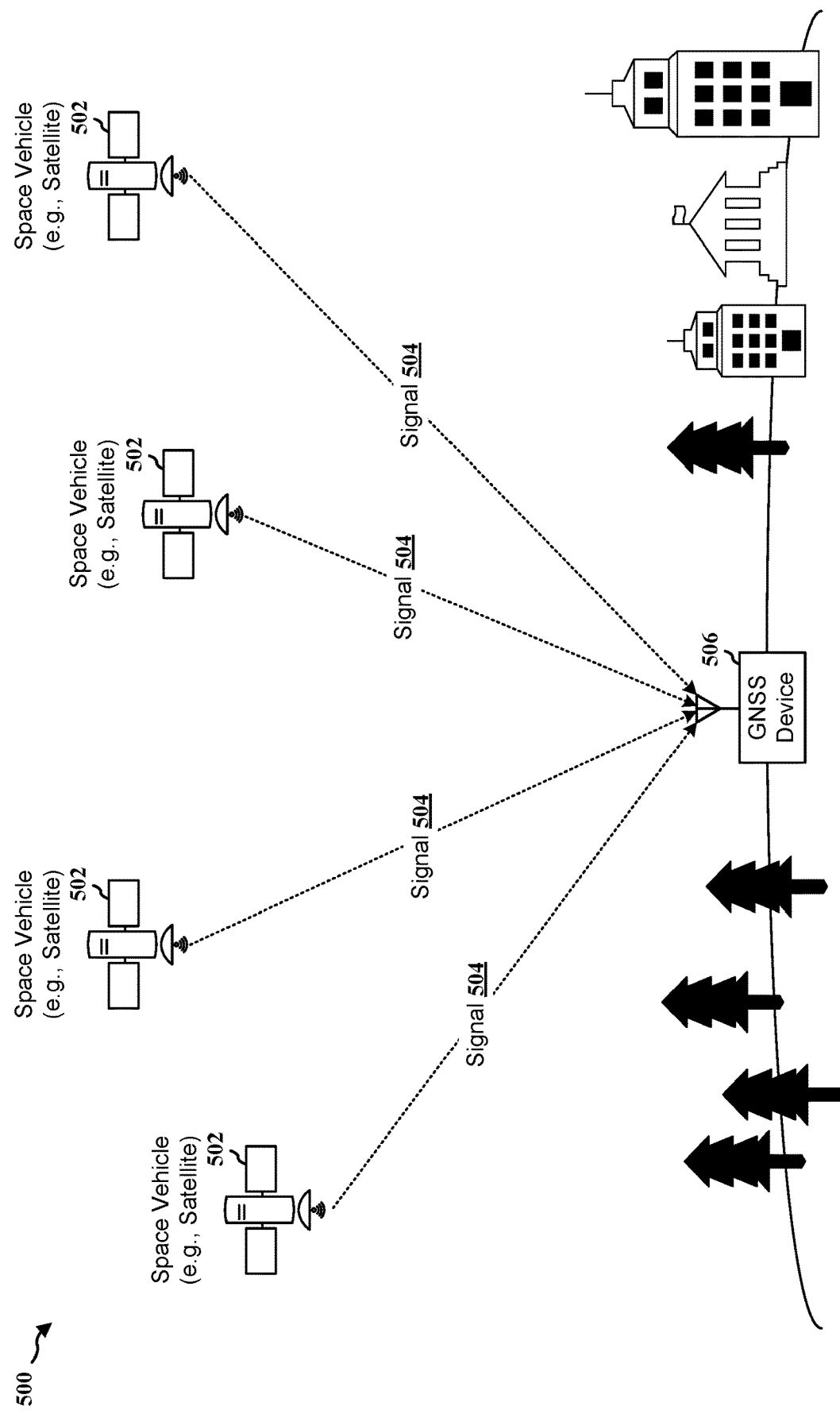
FIG. 5 is a diagram illustrating an example of Global Navigation Satellite System (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for the SVs 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from the SVs 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned. The accuracy of GNSS positioning may depend on various factors, such as SV geometry, GNSS signal blockage, atmospheric conditions, and/or GNSS receiver design features/quality, etc. For example, GNSS receivers used by smartphones or smart watches may have an accuracy lower than GNSS receivers used by vehicles and surveying equipment.

The accuracy of GNSS based positioning may depend on various factors, such as satellite geometry, signal blockage, atmospheric conditions, and/or receiver design features/quality, etc. For example, GNSS receivers used by smartphones or smart watches may have an accuracy lower than GNSS receivers used by vehicles and surveying equipment. To improve the accuracy of GNSS positioning (e.g., from meters to centimeters), a real time kinematics (RTK) technique or mechanism may be used for a positioning device. RTK is a technique or mechanism that may be used by a positioning device (e.g., a UE, a surveying equipment, an automobile GNSS system, etc.) to improve the accuracy of positioning. For example, based on RTK, a positioning device may use a base station's correction information to mitigate several error sources in GNSS receiver PR and CP measurement of the positioning device, which may include satellite orbit, satellite clock, atmospheric error, etc. Thus, better accuracy may be achieved by the positioning device.

Figure 6:
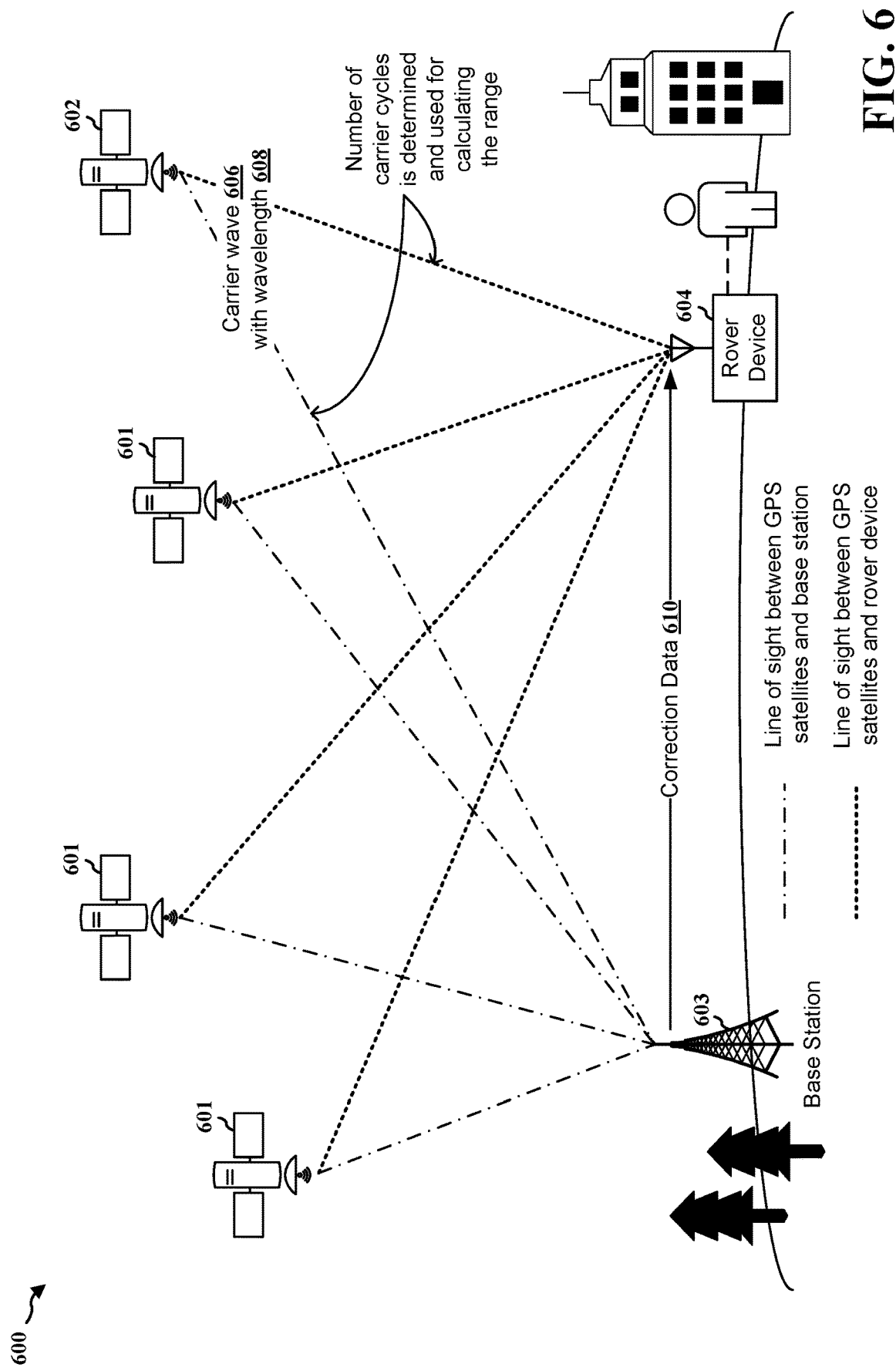
FIG. 6 is a diagram illustrating an example of a real time kinematics (RTK) positioning in accordance with various aspects of the present disclosure.

FIG. 6 is a diagram 600 illustrating an example of an RTK positioning in accordance with various aspects of the present disclosure. In one example, at least two receivers may be used in association with the RTK positioning, where at least one of the receivers may be stationary, which may be referred to as a base station 603 (or an RTK base station), and at least one other receiver may be mobile (e.g., may move freely), which may be referred to as a rover or a rover device 604 (e.g., a GNSS/GPS receiver, a UE, a rover station, etc.). In other words, an RTK system may include a base station and a rover, where the base station may be a stationary receiver whose location is known.

A range between an SV 602 (e.g., a GNSS/GPS satellite) and the rover device 604 or between the SV 602 and the base station 603 may be calculated by determining a number of carrier cycles between the SV 602 and the rover device 604 or the base station 603, and multiplying this number by the carrier wavelength 608 of a carrier wave 606 (e.g., a carrier signal) transmitted by the SV 602. For example, if the SV 602 is transmitting a carrier wave 606 with a wavelength 608 of ten (10) meters, and the rover device 604 receives the carrier wave 606 and determines that there are five hundred (600) carrier cycles between the SV 602 and the rover device 604, then the rover device 604 may calculate the distance between the SV 602 and the rover device 604 by multiplying the number of carriers cycles determined (e.g., 600) with the carrier wavelength 608 (e.g., 10 meters), which may be five thousand meters (e.g., 600×10=6000). Similarly, the base station 603 may also receive the carrier wave 606 from the SV 602 and determine its ranges from the SV 602 based on the wavelength 608 of the carrier wave 606 and the number of carrier cycles between the base station 603 and the SV 602. The rover device 604 and/or the base station 603 may calculate ranges (e.g., distances) between the rover device 604/base station 603 and multiple (e.g., four or more) SVs (e.g., SVs 601 and 602) to determine their geographical locations (e.g., their locations on the Earth).

During the RTK positioning, the rover device 604 (e.g., a UE, a client device, etc.) may undergo an "ambiguity resolution" process to determine the number of carrier cycles between a SV 602 and the rover device 604. In other words, when the rover device 604 receives a carrier wave from a SV 602, it may take time for the rover device 604 to figure out how many carrier cycles are between the SV 602 and the rover device 604. In some examples, a GNSS receiver with more sophisticated or high-end antenna/hardware, such as an automotive grade antenna, may be able to resolve the ambiguity within a relatively short time (e.g., within seconds), while a GNSS receiver with less sophisticated or low-end antenna/hardware, such as antenna for mobile phone, and/or a smart watch, may take a longer time (e.g., 10-30 minutes or more) to resolve the ambiguity. In some examples, the ambiguity may also be referred to as an "integer ambiguity."

In some examples, ranges calculated by the rover device 604 may include errors due to SV clock and ephemerides, and ionospheric and tropospheric delays, etc. Also, as the rover device 604 is more likely to be moving, the quality of a signal/carrier wave received from each SV may change as the rover device moves from one location to another location. For example, if the rover device 604 moves from an open sky area to an area with buildings, signals from one or more SVs 601/602 may be blocked/reflected by the buildings. As such, ranges calculated by the rover device 604 may start to drift and may include error(s).

On the other hand, as the base station 603 is likely to be stationary with a known location, and the base station 603 may be equipped with a more sophisticated and high-end GNSS receiver, the base station 603 may be able to maintain an accurate calculation for the ranges compared to the rover device 604. For example, the base station 603 may be configured to locate at a site (e.g., an open sky area) that has minimal environmental effects such as interference and multipath. As such, under the RTK positioning, the base station 603 may be configured to calculate its location by using the signal received from SVs (e.g., the SVs 601/602) based on the carrier phase measurement, then the base station 603 may compare the calculated location to its known location to identify if there are any errors. If the base station 603 identifies that there are errors, the base station 603 may generate a correction data 610 (or a correction signal) and transmit the correction data 610 to the rover device 604 to assist the rover device 604 in correcting the errors. For example, as the rover device 604 may typically be configured to locate in proximity to the base station 603 (e.g., within 6 miles, 12 miles, etc.), the rover device 604 is likely to encounter similar errors (e.g., similar ionospheric and tropospheric delays) as the base station 603. Thus, the rover device 604 may use the correction data 610 from the base station 603 to improve its own computed position from the GNSS constellations to achieve centimeter precision. In other words, a base station may be configured to stay in a fixed/known location and send correction data to one or more rover devices, and the one or more rover devices may use the correction data to increase the precision of their positioning and also the speed of error correction. As such, the rover device 604 may determine its position using algorithms that incorporate ambiguity resolution and differential correction. The position accuracy achievable by the rover device 604 may depend on its distance from the base station 603 and the accuracy of the differential corrections (e.g., the correction data 610).

In some scenarios, non-line-of-sight (NLOS) GNSS measurements (e.g., measurement of GNSS signal by a GNSS device) may degrade outdoor position fix accuracy, such as within urban areas. For example, if there are obstacles, such as physical structures (e.g., buildings, tunnels) and terrains (e.g., mountains), between SVs and a GNSS device, the GNSS signals received by the GNSS device may be weakened and/or include an offset/delay. Similarly, for network-based positioning discussed in connection with FIG. 4, NLOS measurements (e.g., measurement of positioning reference signals) may also degrade the accuracy of UE positioning, such as by causing delays to the reference signals).

Figure 7:
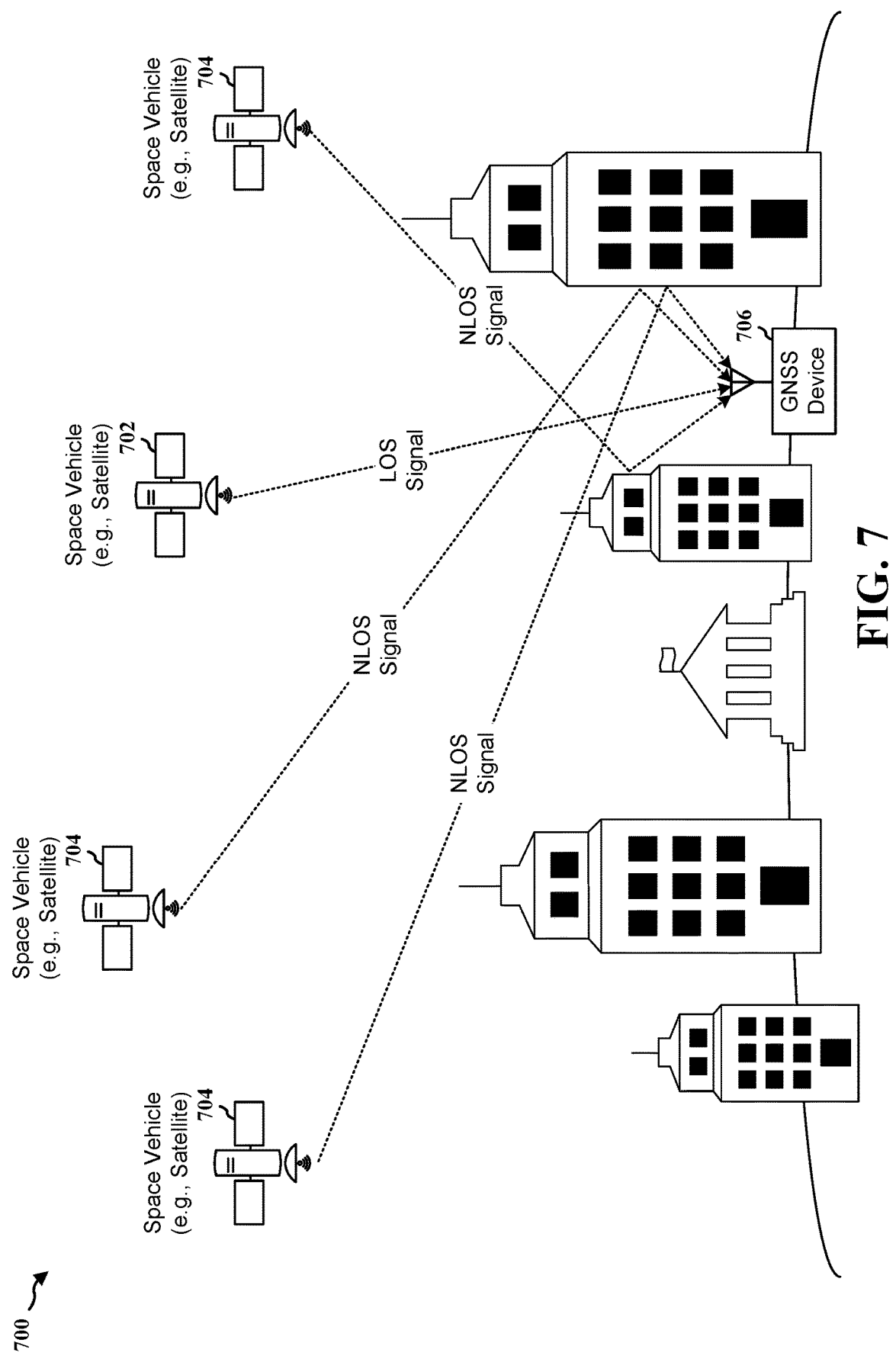
FIG. 7 is a diagram illustrating an example of non-line-of-sight (NLOS) GNSS measurements in an urban area in accordance with various aspects of the present disclosure.

FIG. 7 is a diagram 700 illustrating an example of NLOS GNSS measurements in an urban area in accordance with various aspects of the present disclosure. A GNSS device 706 may receive GNSS signals from an SV 702 based on a line-of-sight (LOS) condition (which may be referred to as LOS signals). However, due to blockage and the environmental conditions, the GNSS device 706 may receive GNSS signals from other SVs 704 based on NLOS conditions (which may be referred to as NLOS signals), where the GNSS signals from the SVs 704 may penetrate through and/or bounce off from one or more objects (e.g., buildings, trees, etc.) before reaching the GNSS device 706. As NLOS signals may typically take a longer time to reach a GNSS device compared to LOS signals, the NLOS signals may include excess delays. Thus, the positioning accuracy and speed of the GNSS device may be reduced when a number of GNSS measurements are based on NLOS conditions. This may in turn reduce the efficiency and accuracy of certain location based service (LBS) applications, such as navigation applications and ride-share application. In addition, the reduction in accuracy may be more significant during a GNSS device warm-start with large (e.g., approximate one kilometer) initial time and position uncertainty. In some examples, the continuous fix accuracy may also be degraded. While the example illustrated by the diagram 700 applies to GNSS-based positioning, similar NLOS condition may also be applied to network-based positioning.

In some examples, services provided for GNSS-based positioning and network-based positioning may be referred to as "positioning, navigation, and timing (PNT) services." As the name indicates, PNT services primarily include three elements: positioning, navigation, and timing. The positioning element may refer to the ability to accurately and precisely determine one's location and orientation two-dimensionally (or three-dimensionally when specified) referenced to a standard geodetic system. The navigation element may refer to the ability to determine the current and desired position (relative or absolute) and apply corrections to course, orientation, and speed to attain the desired position anywhere around the world, from sub-surface to surface and from the surface to space. The timing element may refer to the ability to acquire and maintain accurate and precise time from a standard (e.g., Coordinated Universal Time, or UTC), anywhere in the world and within user-defined timeliness parameters. Timing may also include time transfer. For purposes of the present disclosure, GNSS-based positioning and network-based positioning may collectively be referred to as radio frequency (RF) based positioning technologies or RF-based positioning services.

For RF-based positioning technologies, signal multipath effect (e.g., the NLOS condition discussed in connection with FIG. 7) is often considered as one of major error sources that may affect the positioning performance. Signal multipath effect or multipath effect may refer to a signal transmitted from a transmitter reaches a receiver via more than one path. For example, a GNSS signal may arrive at a GNSS receiver's antenna via multiple and different paths, which may affect both pseudorange and carrier phase measurements at the GNSS receiver. As such, for many positioning devices, how to handle the multipath effect (e.g., such as in signal challenging environments) has been an important aspect of the device design. For example, for GNSS-based positioning (or GNSS-based PNT), a GNSS receiver may detect and/or mitigate multipath effect based on pseudorange (PR) one-side de-weighting, signal-to-noise measurements, three-dimensional (3D) mapping aided, machine learning (ML), or a combination thereof.

Aspects presented herein may improve the performance and accuracy of RF-based positioning. Aspects presented herein may enable a device to use RF Doppler measurements to detect and mitigate multipath effects in RF-based positioning. The RF-based positioning may include satellite navigation (e.g., GNSS, low Earth orbit (LEO) satellite, etc.), terrestrial positioning system (e.g., network-based positioning associated with 5G NR, 4G LTE, etc.), and/or indoor positioning (e.g., Wi-Fi based positioning, Ultra-wideband (UWB) positioning, Bluetooth positioning, etc.). As Doppler measurements may be ubiquitous in most RF-based systems and may not specify additional hardware infrastructure, aspects presented herein may apply to a wide range of RF-based positioning technologies.

Doppler measurements may include measurement of the Doppler effect/shift. Doppler effect/shift may refer to the change in frequency of a wave in relation to an observer who is moving relative to the wave source. For example, when the source of the waves is moving towards the observer, each successive wave crest may be emitted from a position closer to the observer than the crest of the previous wave. Therefore, each wave may take slightly less time to reach the observer than the previous wave. Hence, the time between the arrivals of successive wave crests at the observer is reduced, causing an increase in the frequency. While they are traveling, the distance between successive wave fronts is reduced, so the waves may "bunch together." On the other hand, if the source of waves is moving away from the observer, each wave may be emitted from a position farther from the observer than the previous wave, so the arrival time between successive waves is increased, reducing the frequency. The distance between successive wave fronts is then increased, so the waves may "spread out" instead.

Figure 8:
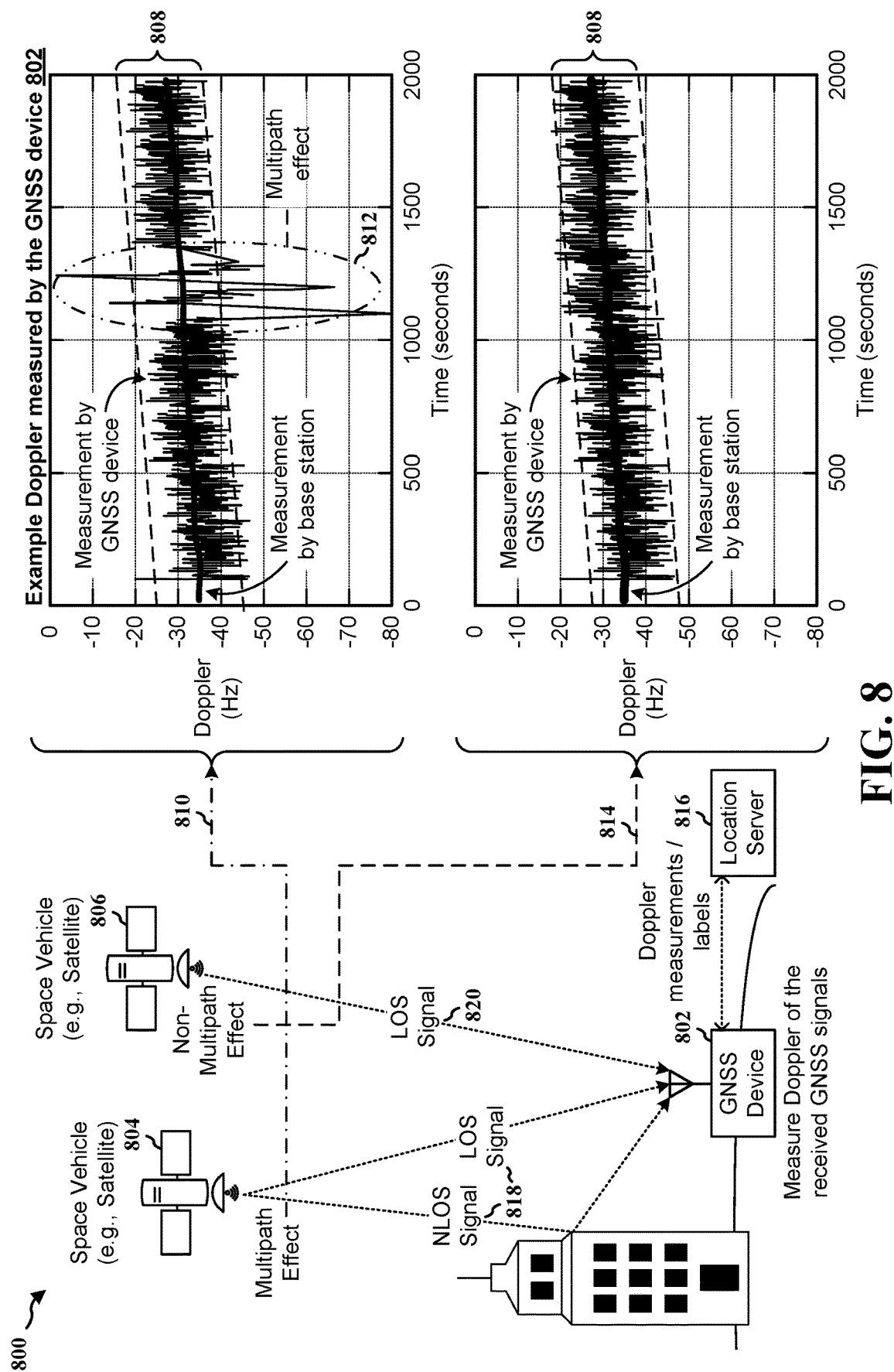
FIG. 8 is a diagram illustrating an example of a GNSS device detecting multipath effect based on Doppler measurements under GNSS scenario in accordance with various aspects of the present disclosure.

FIG. 8 is a diagram 800 illustrating an example of a GNSS device detecting multipath effect based on Doppler measurements under GNSS scenario in accordance with various aspects of the present disclosure. In one aspect of the present disclosure, a GNSS device 802 (which may be a UE) may receive signals transmitted from one or more SVs, which may include a first SV 804 and a second SV 806. Then, the GNSS device 802 may measure the Doppler shift of the signals received. For example, the Doppler shift may be measured based on $\Delta f = \Delta v/c f_0$, where $\Delta v$ is the relative velocity between the GNSS device 802 and an SV (e.g., $\Delta v = \vec{v}_{GNSS\ SV} - \vec{v}_{receiver}$), c is the speed of light (e.g., RF speed), and $f_0$ is transmission frequency. If the velocity of the GNSS device 802 has been determined, the line-of-sight Doppler may be computed. In addition, the residual for the Doppler shift, which may also be referred to as Doppler residual or Doppler shift residual, can be obtained based on calculating the difference between an expected Doppler shift and a measured Doppler shift (e.g., Doppler Residual=expected Doppler shift−measured Doppler shift).

Thus, based on the Doppler shift measured or the Doppler residual calculated, the GNSS device 802 may determine whether a received signal is a multipath signal. For example, a received signal may be a multipath signal if its Doppler shift residual exceeds a Doppler shift threshold (or its measured Doppler shift exceeds expected Doppler shift by a margin/threshold). For example, as shown at 810 and 814, the GNSS device 802 may measure Doppler shifts of the signals transmitted from the first SV 804 and the second SV 806, and the GNSS device 802 may calculate the residuals of the Doppler shifts and compare the calculated Doppler shift residuals to a Doppler shift threshold. Aspects presented herein may be used for positioning associated with smartphone, automotive positioning, unmanned aerial vehicle (UAV) in deep urban area (e.g., metropolitan area), wearables, and/or connected smart systems (IoTs), etc.

In one aspect, the Doppler shift threshold may be based on Doppler measurement(s) from another GNSS device, such as a base station used for RTK described in connection with FIG. 6 (e.g., the base station 603). For example, as shown at 808, the Doppler shift threshold may be based on an expected Doppler shift (e.g., a constant value measured by the base station) plus and minus (+/−) a Doppler shift range (e.g., Hz, 20 Hz, etc.). In another example, the Doppler shift threshold may be based on a range, where the range may be different for different SVs (e.g., an upper bound of Hz and a lower bound of −20 Hz for the first SV 804, an upper bound of −20 Hz and a lower bound of −45 Hz for the second SV 806, etc.). Note aspects presented herein may apply to all types of GNSS positioning techniques and is not limited to the RTK.

In another aspect, the Doppler shift threshold may be configured to be dynamic. For example, the Doppler shift threshold (or the Doppler shift range for the Doppler shift threshold) may be configured to be a function of the measured Doppler shift/Doppler residual. If the measured Doppler shift/Doppler residual is within a first range (e.g., −20 to −40 Hz), a first Doppler shift threshold/range (−15 to −45 Hz) may be applied by the GNSS device 802, and if the measured Doppler shift/Doppler residual is within a second range (e.g., −10 to −40 Hz), a second Doppler shift threshold/range (e.g., −5 to −45 Hz) may be applied by the GNSS device 802. In another example, the Doppler shift range may be configured to be a function of the velocity of the GNSS device 802. For example, if the GNSS device 802 is moving at a lower speed (e.g., below 65 miles per hour), the Doppler shift range may be smaller (e.g., plus and minus 10 Hz), and if the GNSS device 802 is moving at a higher speed (e.g., above 65 miles per hour), the Doppler shift range may be larger (e.g., plus and minus 20 Hz), etc. In another example, the Doppler shift range may be configured to be a function of the environment surrounding the GNSS device 802. For example, if the GNSS device 802 is at an environment that is less likely to have signal blockage or reflection (e.g., an open-sky or a light urban environment), the Doppler shift threshold/range may be lower, whereas if the GNSS device 802 is at an environment that is more likely to have signal blockage or reflection (e.g., a metropolitan or a deep urban environment), the Doppler shift threshold/range may be larger.

Then, as shown at 812, if the calculated Doppler shift residual for the signals received from the first SV 804 exceed the Doppler shift threshold or the measured Doppler shift exceed the expected Doppler shift by a margin/threshold (for certain time periods or duration), the first SV 804 may determine that the signals received from the first SV 804 are multipath signals. On the other hand, as shown at 814, as Doppler shift residuals for signals transmitted from the second SV 806 do not exceed the Doppler shift threshold, The GNSS device 802 may determine that the signals transmitted from the second SV 806 are not subjected to multipath effect (e.g., the signals are LOS signals/non-multipath signals). As such, aspects presented herein may enable the GNSS device 802 or a location entity/server to detect multipath signals based on Doppler residual or Doppler shift, where the Doppler residual is equal to expected (or modelled) Doppler shift minus measured Doppler shift. The expected Doppler shift may be determined if the velocity of the GNSS device 802 is accurate. In some examples, the velocity of the GNSS device 802 may be estimated from other sources, e.g., Doppler shift from other RF ranging system, inertial measurement unit (IMU) sensor, or vehicle sensors, etc. Doppler residual may consist of multipath term and noise terms (e.g., Gaussian white noise). The multipath term may typically show one-side effect on speed estimation. Namely, multipath may make the estimated speed smaller than actual. Detection of such a pattern may indicate the presence of multipath. For purposes of the present disclosure, a multipath signal may refer to an NLOS signal (e.g., the signal is received just via reflection(s) as shown at 918 and 920 of FIG. 9) or a signal that includes at least one NLOS signal (e.g., the signal is received via a combination of LOS and NLOS signals as shown at 818 of FIG. 8). As such, in some scenarios, the term multipath signal and the term NLOS signal may be used interchangeably throughout the specification. However, it does not mean that the two effects (e.g., the multipath effect and the NLOS effect) are the same. In some examples, if a signal is received just via reflection, it may not be interpreted as a multipath signal. On the other hand, a non-multipath signal may refer to an LOS signal (e.g., the signal is received directly as shown at 820 of FIG. 8).

Based on determining whether signals received from different SVs are multipath signals or non-multipath signals (or are LOS signals or NLOS signals), the GNSS device 802 (e.g., for UE-based positioning) or a network entity/server (e.g., for UE-assisted positioning) may label, de-weight, and/or exclude one or more signals received from one or more SVs. For example, if the GNSS device 802 is performing a positioning session with multiple SVs that include the first SV 804, the GNSS device 802 or the network entity/server may exclude measurements associated with the first SV 804 for the position calculation/estimation as signals from the first SV 804 are determined to be multipath signals. In another example, instead of excluding the measurements associated with the first SV 804, the GNSS device 802 or the network entity/server may de-weight the measurements, such as by providing less weight for the measurements compared to measurements obtained from non-multipath signals. For example, the measurement of each signal from the first SV 804 may be de-weighted by a factor W (e.g., 0≤W<1), where W may be based on a difference between the measured Doppler shift/Doppler shift residuals and a threshold Doppler shift. In other words, W may be configured to be a function of the difference between the measured Doppler shift/Doppler shift residuals and a threshold Doppler shift (e.g., |D−DT|), such as inversely proportional to the difference (e.g., higher difference is associated with a lower factor value and lower difference is associated with a higher factor value, etc.). In another example, W may be configured to be a function of the number of SVs that are transmitting non-multipath/LOS signals. For example, when there are more SVs that are transmitting non-multipath/LOS signals, a lower factor W (e.g., higher de-weighting) may be applied to measurements associated with multipath/NLOS signals, whereas when there are lesser SVs that are transmitting non-multipath/LOS signals, a higher factor W (e.g., lower de-weighting) may be applied to measurements associated with multipath/NLOS signals, etc. As such, a first number N may be equal to a number of one or more SVs, a second number M may equal to a number of SVs of the one or more SVs from which signals are received that are determined to be multipath signals, and W may be based on a comparison of the first number N and the second number M. In another example, the GNSS device 802 may simply label the measurements (e.g., as multipath/NLOS signals or non-multipath/LOS signals), and a corresponding location server/entity (e.g., the location server 816) may exclude or de-weight the measurements based on the labels.

In another example, as an alternatively, the GNSS device 802 or the network entity/server may give more weights to non-multipath or LOS measurements. For example, if the GNSS device 802 determines that signals from the second SV 806 are LOS signals, the GNSS device 802 may give heavier weight(s) (e.g., W>1) for measurements associated with the second SV 806.

In another aspect, there may be more than one Doppler shift threshold, where the GNSS device 802 may de-weight measurements of an SV if the measurements (e.g., Doppler residuals or measured Doppler shifts) are above a first Doppler shift threshold but below a second Doppler shift threshold, and the GNSS device 802 may exclude the measurements if the measurements are above the second Doppler shift threshold. For example, a first upper bound Doppler threshold of 20 Hz and a second upper bound Doppler threshold of 40 Hz may be defined for the first SV 804. If Doppler measurements from the first SV 804 is within 20 to 40 Hz, the GNSS device 802 may de-weight the measurements. On the other hand, if Doppler measurements from the first SV 804 is above 40 Hz, the GNSS device 802 may exclude the measurements (e.g., measurements associated with the first SV 804 may be ignored).

As such, aspects presented herein may enable a GNSS device or a location entity/server to mitigate positioning errors by checking the Doppler residuals. If the Doppler residual over a predefined threshold (Limit_1), the Doppler may be treated as an outliner and the corresponding signal may be labelled as strong multipath. The ranging measurement(s) such as pseudorange and/or carrier phase of this signal may be removed. If the Doppler residual is less than Limit_1 but larger than another threshold (Limit_2) corresponding to the noise level of Doppler measurement. The ranging measurement (PR/CP) may be de-weighted based on the Doppler residual value.

While examples described in connection with FIG. 8 show the GNSS device 802 may determine whether signals from an SV are multipath signals or non-multipath signals, the determination may also be made by a location entity/server (e.g., for UE-assisted positioning). For example, the GNSS device 802 may transmit measurement information or a position estimate associated with the de-weighted or the excluded signals to a location entity/server 816 for processing at the location entity/server. In another example, the GNSS device 802 may transmit information indicating whether the measurement information or the position estimate is associated with multipath signals to the location entity/server 816 (e.g., the labeling information is transmitted to the location entity/server for processing at the location server).

Figure 9:
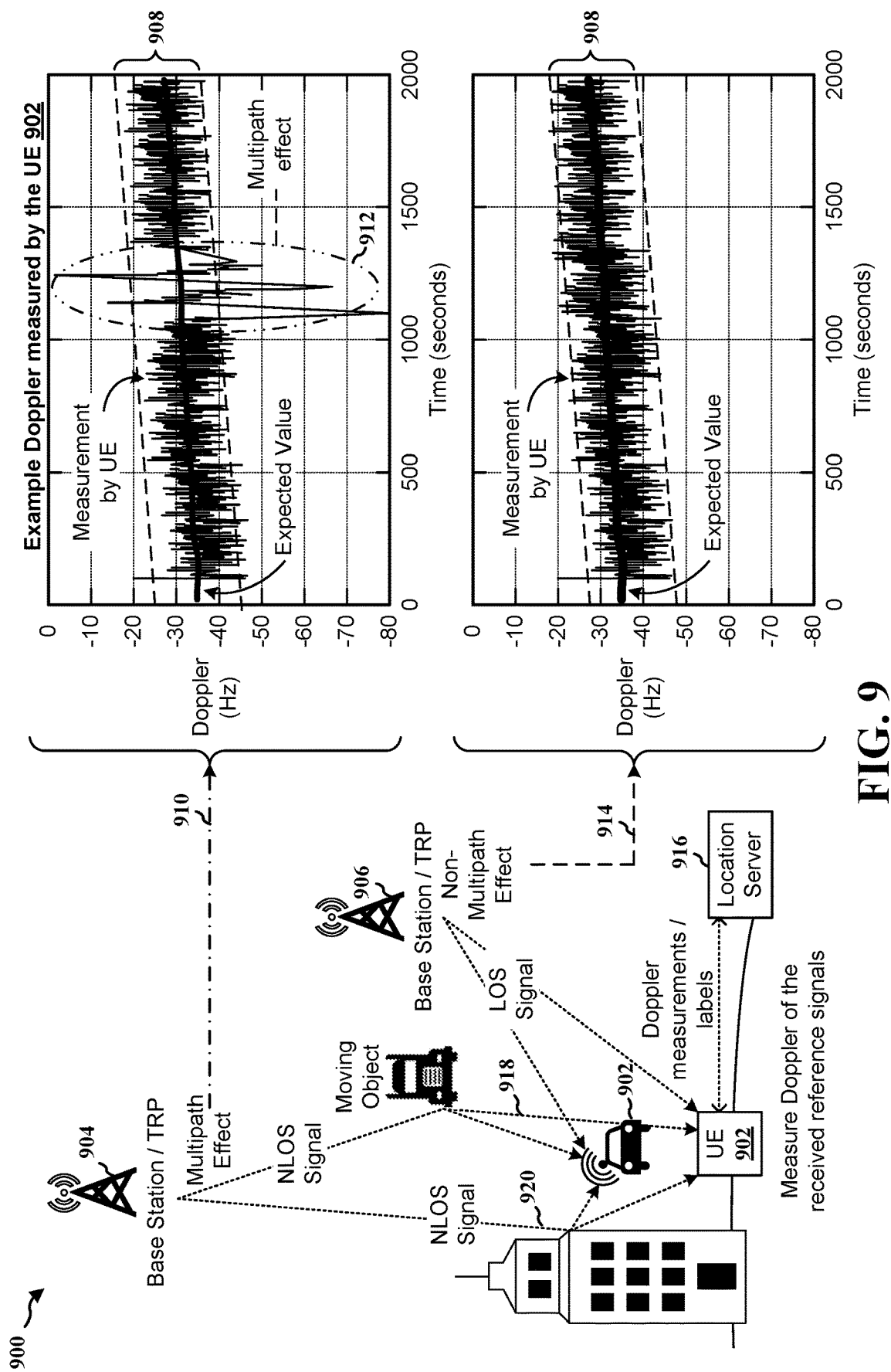
FIG. 9 is a diagram illustrating an example of a UE detecting multipath effect based on Doppler measurements under terrestrial scenario in accordance with various aspects of the present disclosure.

FIG. 9 is a diagram 900 illustrating an example of a UE detecting multipath effect based on Doppler measurements under terrestrial scenario in accordance with various aspects of the present disclosure. In another aspect of the present disclosure, during a network-based positioning session, a UE 902, which may be static or moving (e.g., a vehicle UE, a pedestrian UE, etc.), may receive signals (e.g., RF signals, reference signals, PRS, etc.) transmitted from one or more base stations or transmission reception points (TRPs) of a base station, which may include a first base station 904 (or a first TRP) and a second base station 906 (or a second TRP), such as described in connection with FIG. 4. Then, the UE 902 may measure the Doppler shift of the reference signals received. For example, the Doppler shift may be measured based on $$\Delta f = \frac{\Delta v}{c} f_0,$$

where $\Delta v$ is the relative velocity between the UE 902 and a base station (e.g., $\Delta v = \vec{v}_{base\ station} - \vec{v}_{UE}$), c is the speed of light (e.g., RF speed), and $f_0$ is the transmission frequency. If the velocity of the UE 902 is able to be determined, such as based on sensors (e.g., GNSS, IMU, vehicle speed sensor (VSS), etc.), Doppler measured at the UE 902 offset from an expected (modelled) value may indicate whether a signal received may be under multipath effect (e.g., the line-of-sight Doppler may be computed). In other words, the residual for the Doppler shift may be obtained based on calculating the difference between an expected Doppler shift and a measured Doppler shift (e.g., Doppler Residual=expected Doppler shift−measured Doppler shift).

Thus, based on the Doppler shift measured or the Doppler residual calculated, the UE 902 may determine whether a received signal is a multipath signal, e.g., a received signal may be a multipath signal if its Doppler shift residual exceeds a Doppler shift threshold (or its measured Doppler shift exceeds expected Doppler shift by a margin/threshold). For example, as shown at 910 and 914, the UE 902 may measure Doppler shifts of the signals transmitted from the first base station 904 and the second base station 906, and the UE 902 may calculate the residuals of the Doppler shifts and compare the calculated Doppler shift residuals to a Doppler shift threshold. The detection of whether a signal may be under multipath effect may include scenarios such as signals reflected from moving object(s) (e.g., trucks) then received by the UE 902 when the UE 902 is static as shown at 918, signals reflected from static objects (e.g., buildings) as shown at 920, and/or signals reflected from a mixture of static and moving objects, etc. Aspects presented herein may be used for positioning associated with smartphone, automotive positioning, unmanned aerial vehicle (UAV) in deep urban area (e.g., metropolitan area), wearables, and/or connected smart systems (IoTs), etc.

In one aspect, the Doppler shift threshold may be based on Doppler based on expected (modelled) value(s), which may be obtained via measurement(s) from another UE or a device with higher capabilities. For example, as shown at 908, the Doppler shift threshold may be based on an expected Doppler shift (e.g., a constant value) plus and minus (+/−) a Doppler shift range (e.g., 10 Hz, 20 Hz, etc.). In another example, the Doppler shift threshold may be based on a range, where the range may be different for different base stations (e.g., an upper bound of 20 Hz and a lower bound of −20 Hz for the first base station 904, an upper bound of −20 Hz and a lower bound of −45 Hz for the second base station 906, etc.).

In another aspect, the Doppler shift threshold may be dynamic. For example, the Doppler shift threshold (or the Doppler shift range for the Doppler shift threshold) may be configured to be a function of the measured Doppler shift/Doppler residual. If the measured Doppler shift/Doppler residual is within a first range (e.g., −20 to −40 Hz), a first Doppler shift threshold/range (−15 to −45 Hz) may be applied by the UE 902, and if the measured Doppler shift/Doppler residual is within a second range (e.g., −10 to −40 Hz), a second Doppler shift threshold/range (e.g., −5 to −45 Hz) may be applied by the UE 902. In another example, the Doppler shift range may be configured to be a function of the velocity of the UE 902. For example, if the UE 902 is moving at a lower speed (e.g., below 65 miles per hour), the Doppler shift range may be smaller (e.g., plus and minus 10 Hz), and if the UE 902 is moving at a higher speed (e.g., above 65 miles per hour), the Doppler shift range may be larger (e.g., plus and minus 20 Hz), etc. In another example, the Doppler shift range may be configured to be a function of the environment surrounding the UE 902. For example, if the UE 902 is at an environment that is less likely to have signal blockage or reflection (e.g., an open-sky or a light urban environment), the Doppler shift threshold/range may be lower, whereas if the UE 902 is at an environment that is more likely to have signal blockage or reflection (e.g., a metropolitan or a deep urban environment), the Doppler shift threshold/range may be larger.

Then, as shown at 912, if the calculated Doppler shift residual for the signals received from the first base station 904 exceeds the Doppler shift threshold or the measured Doppler shift exceed the expected Doppler shift by a margin/threshold (for certain time periods or duration), the first base station 904 may determine that the signals received from the first base station 904 are multipath signals. On the other hand, as shown at 914, as Doppler shift residuals for signals transmitted from the second base station 906 do not exceed the Doppler shift threshold, The UE 902 may determine that the signals transmitted from the second base station 906 are not subjected to multipath effect (e.g., the signals are LOS signals/non-multipath signals). As such, aspects presented herein may enable the UE 902 or a location entity/server 916 to detect multipath signals based on Doppler residual, where the Doppler residual may equal to expected (or modelled) Doppler minus measured Doppler.

Based on determining whether signals received from different base stations are multipath signals or non-multipath signals (or are LOS signals or NLOS signals), the UE 902 (e.g., for UE-based positioning) or a network entity/server (e.g., for UE-assisted positioning) may label, de-weight, and/or exclude one or more signals received from one or more base stations. For example, if the UE 902 is performing a positioning session with multiple base stations that include the first base station 904, the UE 902 or the network entity/server (e.g., the location server 916) may exclude measurements associated with the first base station 904 for the position calculation/estimation as signals from the first base station 904 are determined to be multipath signals. In another example, instead of excluding the measurements associated with the first base station 904, the UE 902 or the network entity/server may de-weight the measurements, such as by providing less weight for the measurements compared to measurements obtained from non-multipath signals. For example, the measurement of each signal from the first base station 904 may be de-weighted by a factor W (e.g., 0≤W<1), where W may be based on a difference between the measured Doppler shift/Doppler shift residuals and a threshold Doppler shift. In other words, W may be configured to be a function of the difference between the measured Doppler shift/Doppler shift residuals and a threshold Doppler shift (e.g., |D−DT|), such as inversely proportional to the difference (e.g., higher difference is associated with a lower factor value and lower difference is associated with a higher factor value, etc.). In another example, W may be configured to be a function of the number of base stations that are transmitting non-multipath/LOS signals. For example, when there are more base stations that are transmitting non-multipath/LOS signals, a lower factor W (e.g., higher de-weighting) may be applied to measurements associated with multipath/NLOS signals, whereas when there are lesser base stations that are transmitting non-multipath/LOS signals, a higher factor W (e.g., lower de-weighting) may be applied to measurements associated with multipath/NLOS signals, etc. As such, a first number N may be equal to a number of one or more base stations, a second number M may equal to a number of base stations of the one or more base stations from which signals are received that are determined to be multipath signals, and W may be based on a comparison of the first number N and the second number M. In another example, the UE 902 may simply label the measurements (e.g., as multipath/NLOS signals or non-multipath/LOS signals), and a corresponding network entity/server (e.g., the location server 916) may exclude or de-weight the measurements based on the labels.

In another example, as an alternatively, the UE 902 or the network entity/server may give more weights to non-multipath or LOS measurements. For example, if the UE 902 determines that signals from the second base station 906 are LOS signals, the UE 902 may give heavier weight(s) (e.g., W>1) for measurements associated with the second base station 906.

In another aspect, there may be more than one Doppler shift threshold, where the UE 902 may de-weight measurements of a base station if the measurements (e.g., Doppler residuals or measured Doppler shifts) are above a first Doppler shift threshold but below a second Doppler shift threshold, and the UE 902 may exclude the measurements if the measurements are above the second Doppler shift threshold. For example, a first upper bound Doppler threshold of 20 Hz and a second upper bound Doppler threshold of 40 Hz may be associated with the first base station 904. If Doppler measurements from the first base station 904 is within 20 to 40 Hz, the UE 902 may de-weight the measurements. On the other hand, if Doppler measurements from the first base station 904 is above 40 Hz, the UE 902 may exclude the measurements (e.g., measurements associated with the first base station 904 may be ignored).

As such, aspects presented herein may enable a UE or a location entity/server to mitigate positioning errors by checking the Doppler residuals. If the Doppler residual over a predefined threshold (Limit_1), the Doppler may be treated as an outliner and the corresponding signal may be labelled as strong multipath. The measurement(s) associated with multipath signal may then be removed. If the Doppler residual is less than Limit_1 but larger than another threshold (Limit_2) corresponding to the noise level of Doppler measurement. The measurement(s) may be de-weighted based on the Doppler residual value.

While examples described in connection with FIG. 9 show the UE 902 may determine whether signals from an base station are multipath signals or non-multipath signals, the determination may also be made by a location entity/server (e.g., for UE-assisted positioning). For example, the UE 902 may transmit measurement information or a position estimate associated with the de-weighted or the excluded signals to a location entity/server 916 for processing at the location entity/server. In another example, the UE 902 may transmit information indicating whether the measurement information or the position estimate is associated with multipath signals to the location entity/server 916 (e.g., the labeling information is transmitted to the location entity/server for processing at the location server).

Figure 10:
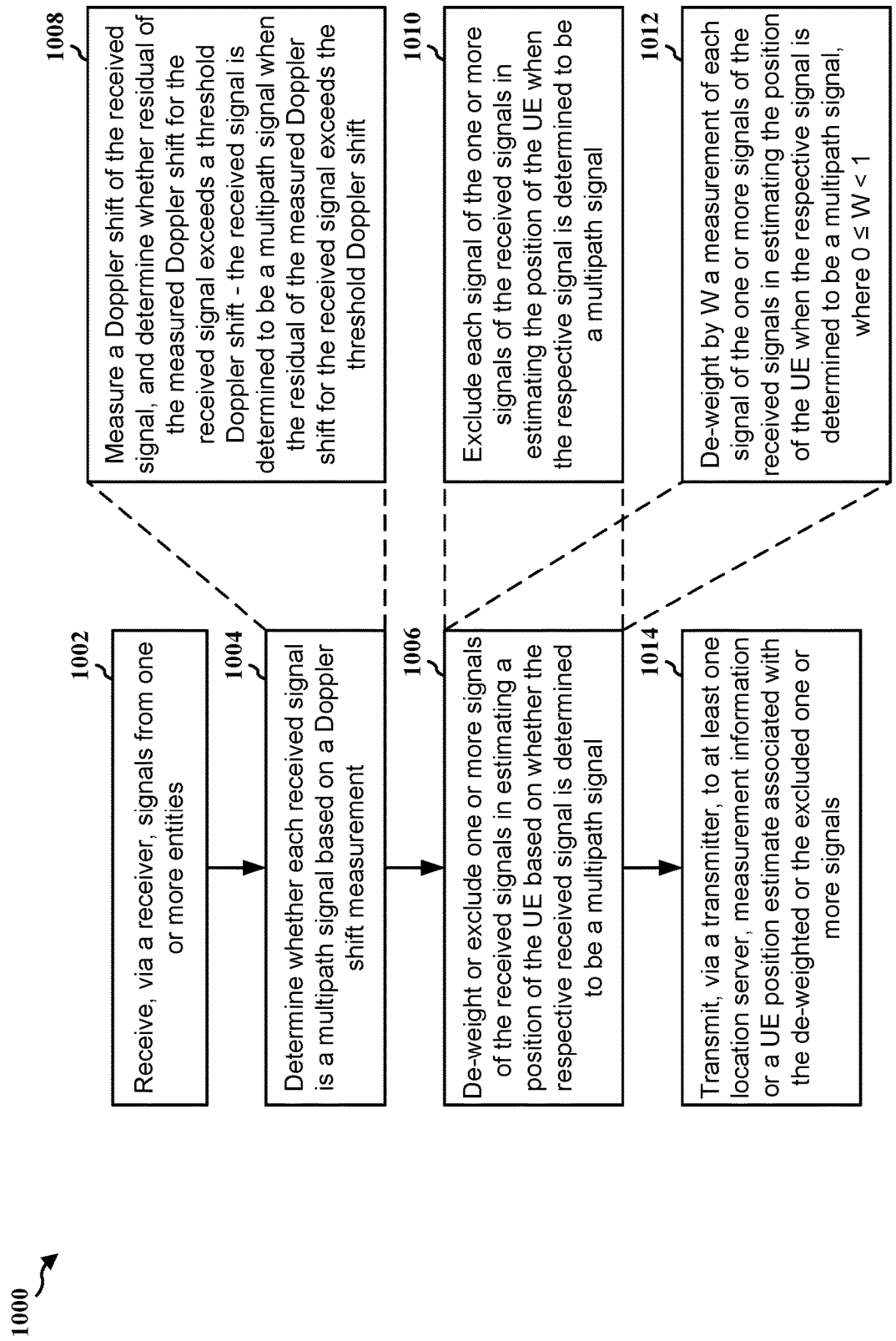
FIG. 10 is a flowchart of a method of wireless communication.

FIG. 10 is a flowchart 1000 of a method of position estimation. The method may be performed by a UE (e.g., the UE 104, 404, 902; the GNSS device 506, 706, 802; the rover device 604; the apparatus 1204). The method may enable the UE to use RF Doppler measurements to detect and mitigate multipath effects in RF-based UE positioning.

At 1002, the UE may receive, via a receiver, signals from one or more entities, such as described in connection with FIGS. 8 and 9. For example, the GNSS device 802 may receive GNSS signals from the first SV 804 and the second SV 806. The reception of the signals may be performed by, e.g., the Doppler measurement component 198 and/or the transceiver(s) 1222 of the apparatus 1204 in FIG. 12.

In one example, the one or more entities include one or more satellites, one or more base stations, or a combination thereof.

At 1004, the UE may determine whether each received signal is a multipath signal based on a Doppler shift measurement, such as described in connection with FIGS. 8 and 9. For example, the GNSS device 802 may determine whether each GNSS signal received from the first SV 804 and the second SV 806 is a multipath signal based on the Doppler shift measurement. The determination of whether each received signal is a multipath signal based on a Doppler shift measurement may be performed by, e.g., the Doppler measurement component 198 of the apparatus 1204 in FIG. 12.

In one example, as shown at 1008, to determine whether each received signal is a multipath signal based on the Doppler shift measurement, the UE may measure a Doppler shift of the received signal, and the UE may determine whether residual of the measured Doppler shift for the received signal exceeds a threshold Doppler shift, where the received signal is determined to be a multipath signal when the residual of the measured Doppler shift for the received signal exceeds the threshold Doppler shift, such as described in connection with FIGS. 8 and 9.

In one example, the threshold Doppler shift may equal to an expected Doppler shift plus or minus a Doppler shift range.

In another example, the Doppler shift range is a constant value.

In another example, the Doppler shift range is a function of the measured Doppler shift.

In another example, the Doppler shift range is a function of the residual of the measured Doppler shift.

In another example, the Doppler shift range is a function of a velocity of the UE.

In another example, the Doppler shift range is a function of an environment of the UE.

In another example, the multipath signal includes a non-line-of-sight signal.

At 1006, the UE may de-weight or exclude one or more signals of the received signals in estimating a position of the UE based on whether the respective received signal is determined to be a multipath signal, such as described in connection with FIGS. 8 and 9. For example, the GNSS device 802 may de-weight or exclude one or more signals received from the first SV 804 in estimating the position of the GNSS device 802 based on the signals from the first SV 804 are multipath signals. The de-weighting or exclusion of the signals may be performed by, e.g., the Doppler measurement component 198 of the apparatus 1204 in FIG. 12.

In one example, as shown at 1010, to de-weight or the exclude one or more signals of the received signals in estimating a position of the UE based on whether the respective received signal is determined to be a multipath signal, the UE may exclude each signal of the one or more signals of the received signals in estimating the position of the UE when the respective signal is determined to be a multipath signal, such as described in connection with FIGS. 8 and 9.

In one example, as shown at 1012, to de-weight or the exclude the de-weighting or the excluding one or more signals of the received signals in estimating a position of the UE based on whether the respective received signal is determined to be a multipath signal, the UE may de-weight by W a measurement of each signal of the one or more signals of the received signals in estimating the position of the UE when the respective signal is determined to be a multipath signal, where 0≤W<1, such as described in connection with FIGS. 8 and 9. In such an example, W is based on a difference between the measured Doppler shift and a threshold Doppler shift. In another example, a first number N is equal to a number of the one or more entities, a second number M is equal to a number of transmitters of the one or more entities from which signals are received that are determined to be multipath, and W is based on a comparison of the first number N and the second number M.

At 1014, the UE may transmit, via a transmitter, to at least one location server, measurement information or a UE position estimate associated with the de-weighted or the excluded one or more signals, such as described in connection with FIGS. 8 and 9. For example, the GNSS device 802 may transmit measurement information or UE position estimate associated with the de-weighted or the excluded GNSS signals to the location server 816. The transmission of the measurement information or the UE position estimate associated with the de-weighted or the excluded one or more signals may be performed by, e.g., the Doppler measurement component 198 and/or the transceiver(s) 1222 of the apparatus 1204 in FIG. 12. In such an example, the UE may transmit, to the at least one location server, information indicating whether the measurement information or the UE position estimate is associated with one or more multipath signals.

Figure 11:
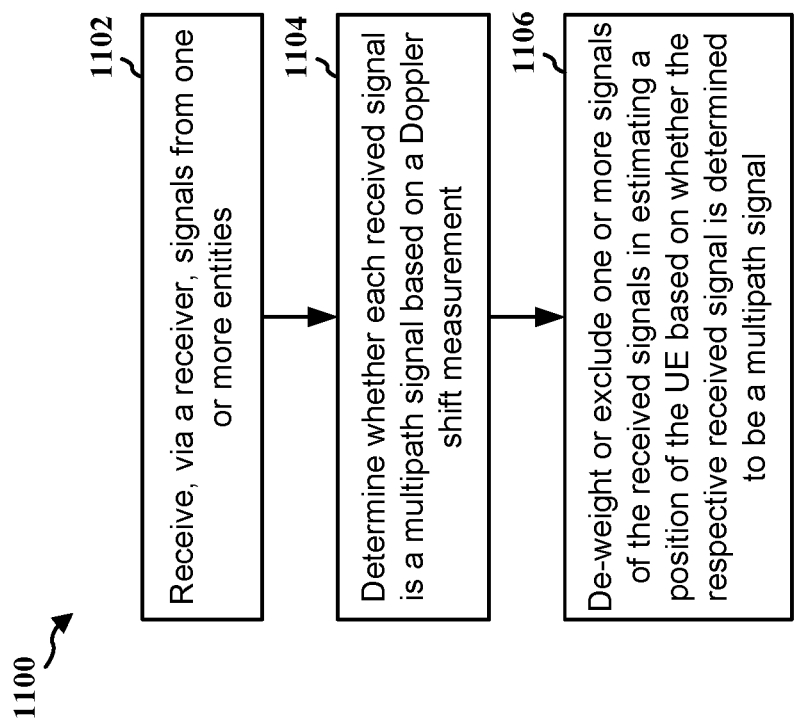
FIG. 11 is a flowchart of a method of wireless communication.

FIG. 11 is a flowchart 1100 of a method of position estimation. The method may be performed by a UE (e.g., the UE 104, 404, 902; the GNSS device 506, 706, 802; the rover device 604; the apparatus 1204). The method may enable the UE to use RF Doppler measurements to detect and mitigate multipath effects in RF-based UE positioning.

At 1102, the UE may receive, via a receiver, signals from one or more entities, such as described in connection with FIGS. 8 and 9. For example, the GNSS device 802 may receive GNSS signals from the first SV 804 and the second SV 806. The reception of the signals may be performed by, e.g., the Doppler measurement component 198 and/or the transceiver(s) 1222 of the apparatus 1204 in FIG. 12.

In one example, the one or more entities include one or more satellites, one or more base stations, or a combination thereof.

At 1104, the UE may determine whether each received signal is a multipath signal based on a Doppler shift measurement, such as described in connection with FIGS. 8 and 9. For example, the GNSS device 802 may determine whether each GNSS signal received from the first SV 804 and the second SV 806 is a multipath signal based on the Doppler shift measurement. The determination of whether each received signal is a multipath signal based on a Doppler shift measurement may be performed by, e.g., the Doppler measurement component 198 of the apparatus 1204 in FIG. 12.

In one example, to determine whether each received signal is a multipath signal based on the Doppler shift measurement, the UE may measure a Doppler shift of the received signal, and the UE may determine whether residual of the measured Doppler shift for the received signal exceeds a threshold Doppler shift, where the received signal is determined to be a multipath signal when the residual of the measured Doppler shift for the received signal exceeds the threshold Doppler shift, such as described in connection with FIGS. 8 and 9.

In another example, the threshold Doppler shift may equal to an expected Doppler shift plus or minus a Doppler shift range.

In another example, the Doppler shift range is a constant value.

In another example, the Doppler shift range is a function of the measured Doppler shift.

In another example, the Doppler shift range is a function of the residual of the measured Doppler shift.

In another example, the Doppler shift range is a function of a velocity of the UE.

In another example, the Doppler shift range is a function of an environment of the UE.

In another example, the multipath signal includes a non-line-of-sight signal.

At 1106, the UE may de-weight or exclude one or more signals of the received signals in estimating a position of the UE based on whether the respective received signal is determined to be a multipath signal, such as described in connection with FIGS. 8 and 9. For example, the GNSS device 802 may de-weight or exclude one or more signals received from the first SV 804 in estimating the position of the GNSS device 802 based on the signals from the first SV 804 are multipath signals. The de-weighting or exclusion of the signals may be performed by, e.g., the Doppler measurement component 198 of the apparatus 1204 in FIG. 12.

In one example, to de-weight or the exclude one or more signals of the received signals in estimating a position of the UE based on whether the respective received signal is determined to be a multipath signal, the UE may exclude each signal of the one or more signals of the received signals in estimating the position of the UE when the respective signal is determined to be a multipath signal, such as described in connection with FIGS. 8 and 9.

In another example, to de-weight or the exclude the de-weighting or the excluding one or more signals of the received signals in estimating a position of the UE based on whether the respective received signal is determined to be a multipath signal, the UE may de-weight by W a measurement of each signal of the one or more signals of the received signals in estimating the position of the UE when the respective signal is determined to be a multipath signal, where $0 \le W < 1$, such as described in connection with FIGS. 8 and 9. In such an example, W is based on a difference between the measured Doppler shift and a threshold Doppler shift. In another example, a first number N is equal to a number of the one or more entities, a second number M is equal to a number of transmitters of the one or more entities from which signals are received that are determined to be multipath, and W is based on a comparison of the first number N and the second number M.

In another example, the UE may transmit, via a transmitter, to at least one location server, measurement information or a UE position estimate associated with the de-weighted or the excluded one or more signals, such as described in connection with FIGS. 8 and 9. For example, the GNSS device 802 may transmit measurement information or UE position estimate associated with the de-weighted or the excluded GNSS signals to the location server 816. The transmission of the measurement information or the UE position estimate associated with the de-weighted or the excluded one or more signals may be performed by, e.g., the Doppler measurement component 198 and/or the transceiver(s) 1222 of the apparatus 1204 in FIG. 12. In such an example, the UE may transmit, to the at least one location server, information indicating whether the measurement information or the UE position estimate is associated with one or more multipath signals.

Figure 12:
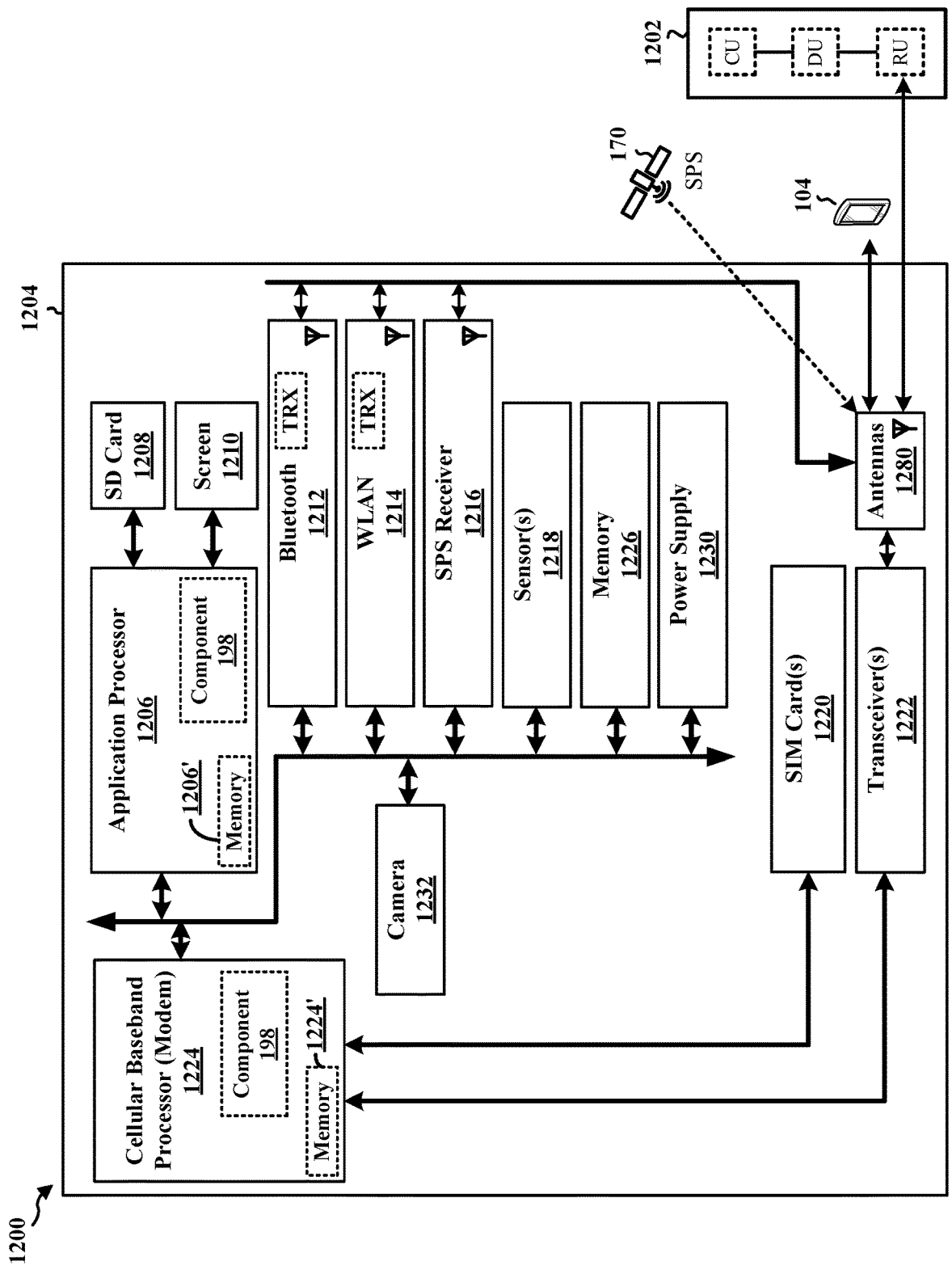
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS receiver 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS receiver 1216 may include an on-chip transceiver (TRX) (or in some cases, just a receiver (RX)). The Bluetooth module 1212, the WLAN module 1214, and the SPS receiver 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', additional memory modules 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the Doppler measurement component 198 is configured to receive, via a receiver, signals from one or more entities; determine whether each received signal is a multipath signal based on a Doppler shift measurement; and de-weight or exclude one or more signals of the received signals in estimating a position of the UE based on whether the respective received signal is determined to be a multipath signal. The Doppler measurement component 198 may be within the cellular baseband processor 1224, the application processor 1206, or both the cellular baseband processor 1224 and the application processor 1206. The Doppler measurement component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving, via a receiver, signals from one or more entities; means for determining whether each received signal is a multipath signal based on a Doppler shift measurement; and means for de-weighting or excluding one or more signals of the received signals in estimating a position of the UE based on whether the respective received signal is determined to be a multipath signal.

In one configuration, the means for determining whether each received signal is a multipath signal based on the Doppler shift measurement includes configuring the apparatus 1204 to: measure a Doppler shift of the received signal; and determine whether residual of the measured Doppler shift for the received signal exceeds a threshold Doppler shift, where the received signal is determined to be a multipath signal when the residual of the measured Doppler shift for the received signal exceeds the threshold Doppler shift. In such a configuration, the threshold Doppler shift is equal to an expected Doppler shift plus or minus a Doppler shift range. In such a configuration, the Doppler shift range is a constant value, a function of the measured Doppler shift, a function of the residual of the measured Doppler shift, a function of a velocity of the UE, or a function of an environment of the UE.

In another configuration, the means for the de-weighting or the excluding one or more signals of the received signals in estimating a position of the UE based on whether the respective received signal is determined to be a multipath signal includes configuring the apparatus 1204 to: exclude each signal of the one or more signals of the received signals in estimating the position of the UE when the respective signal is determined to be a multipath signal.

In another configuration, the means for the de-weighting or the excluding one or more signals of the received signals in estimating a position of the UE based on whether the respective received signal is determined to be a multipath signal includes configuring the apparatus 1204 to de-weight by W a measurement of each signal of the one or more signals of the received signals in estimating the position of the UE when the respective signal is determined to be a multipath signal, where $0 \le W < 1$. In such a configuration, W is based on a difference between the measured Doppler shift and a threshold Doppler shift. In another configuration, a first number N is equal to a number of the one or more entities, a second number M is equal to a number of transmitters of the one or more entities from which signals are received that are determined to be multipath, and W is based on a comparison of the first number N and the second number M.

In another configuration, the apparatus 1204 further includes means for transmitting, via a transmitter, to at least one location server, measurement information or a UE position estimate associated with the de-weighted or the excluded one or more signals. In such a configuration, the apparatus 1204 further includes means for transmitting, to the at least one location server, information indicating whether the measurement information or the UE position estimate is associated with one or more multipath signals.

In another configuration, the multipath signal includes a non-line-of-sight signal.

The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
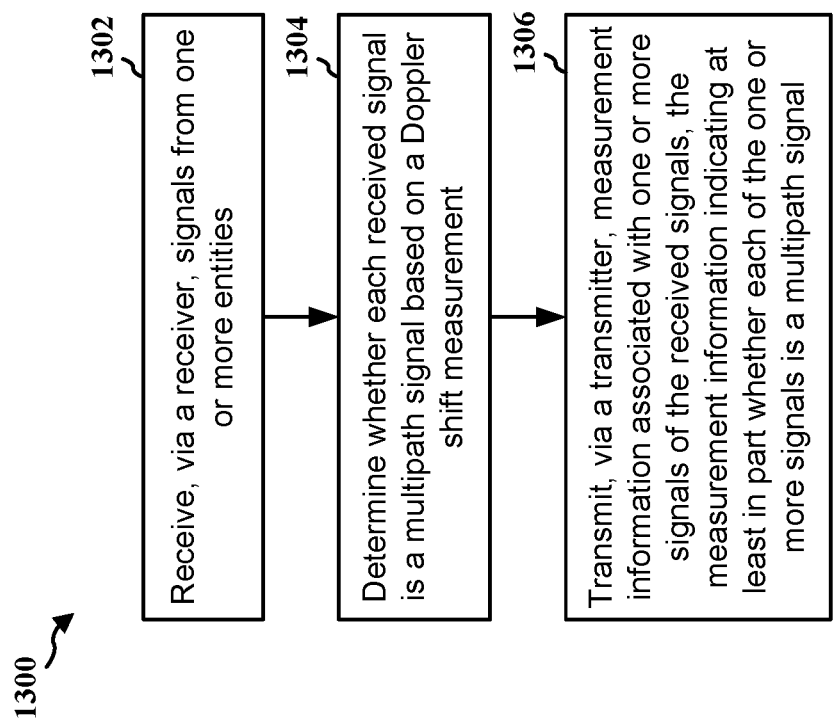
FIG. 13 is a flowchart of a method of wireless communication.

FIG. 13 is a flowchart 1300 of a method of position estimation. The method may be performed by a UE (e.g., the UE 104, 404, 902; the GNSS device 506, 706, 802; the rover device 604; the apparatus 1204). The method may enable the UE to indicate to a location server whether signals received from one or more entities are multipath signals.

At 1302, the UE may receive, via a receiver, signals from one or more entities, such as described in connection with FIGS. 8 and 9. For example, the GNSS device 802 may receive GNSS signals from the first SV 804 and the second SV 806. The reception of the signals may be performed by, e.g., the Doppler measurement component 198 and/or the transceiver(s) 1422 of the apparatus 1404 in FIG. 14.

In one example, the one or more entities include one or more satellites, one or more base stations, or a combination thereof.

At 1304, the UE may determine whether each received signal is a multipath signal based on a Doppler shift measurement, such as described in connection with FIGS. 8 and 9. For example, the GNSS device 802 may determine whether each GNSS signal received from the first SV 804 and the second SV 806 is a multipath signal based on the Doppler shift measurement. The determination of whether each received signal is a multipath signal based on a Doppler shift measurement may be performed by, e.g., the Doppler measurement component 198 of the apparatus 1404 in FIG. 14.

In one example, to determine whether each received signal is a multipath signal based on the Doppler shift measurement, the UE may measure a Doppler shift of the received signal, and the UE may determine whether residual of the measured Doppler shift for the received signal exceeds a threshold Doppler shift, where the received signal is determined to be a multipath signal when the residual of the measured Doppler shift for the received signal exceeds the threshold Doppler shift, such as described in connection with FIGS. 8 and 9. In such an example, the threshold Doppler shift may equal to an expected Doppler shift plus or minus a Doppler shift range. In such an example, the Doppler shift range is one of: a constant value, a function of the measured Doppler shift, a function of the residual of the measured Doppler shift, a function of a velocity of the UE, or a function of an environment of the UE.

In another example, the multipath signal includes a non-line-of-sight signal.

At 1306, the UE may transmit, via a transmitter, measurement information associated with one or more signals of the received signals, the measurement information indicating at least in part whether each of the one or more signals is a multipath signal, such as described in connection with FIGS. 8 and 9. For example, the GNSS device 802 may transmit measurement information associated with GNSS signals received from the first SV 804 and the second SV 806 to the location server 816, where the measurement information may indicate at least in part whether each of the one or more signals is a multipath signal (e.g., for UE-assisted positioning). The transmission of the measurement information may be performed by, e.g., the Doppler measurement component 198 of the apparatus 1404 in FIG. 14.

In one example, the measurement information further indicates the Doppler shift measurement for the one or more signals.

In another example, the measurement information is transmitted to a location server.

Figure 14:
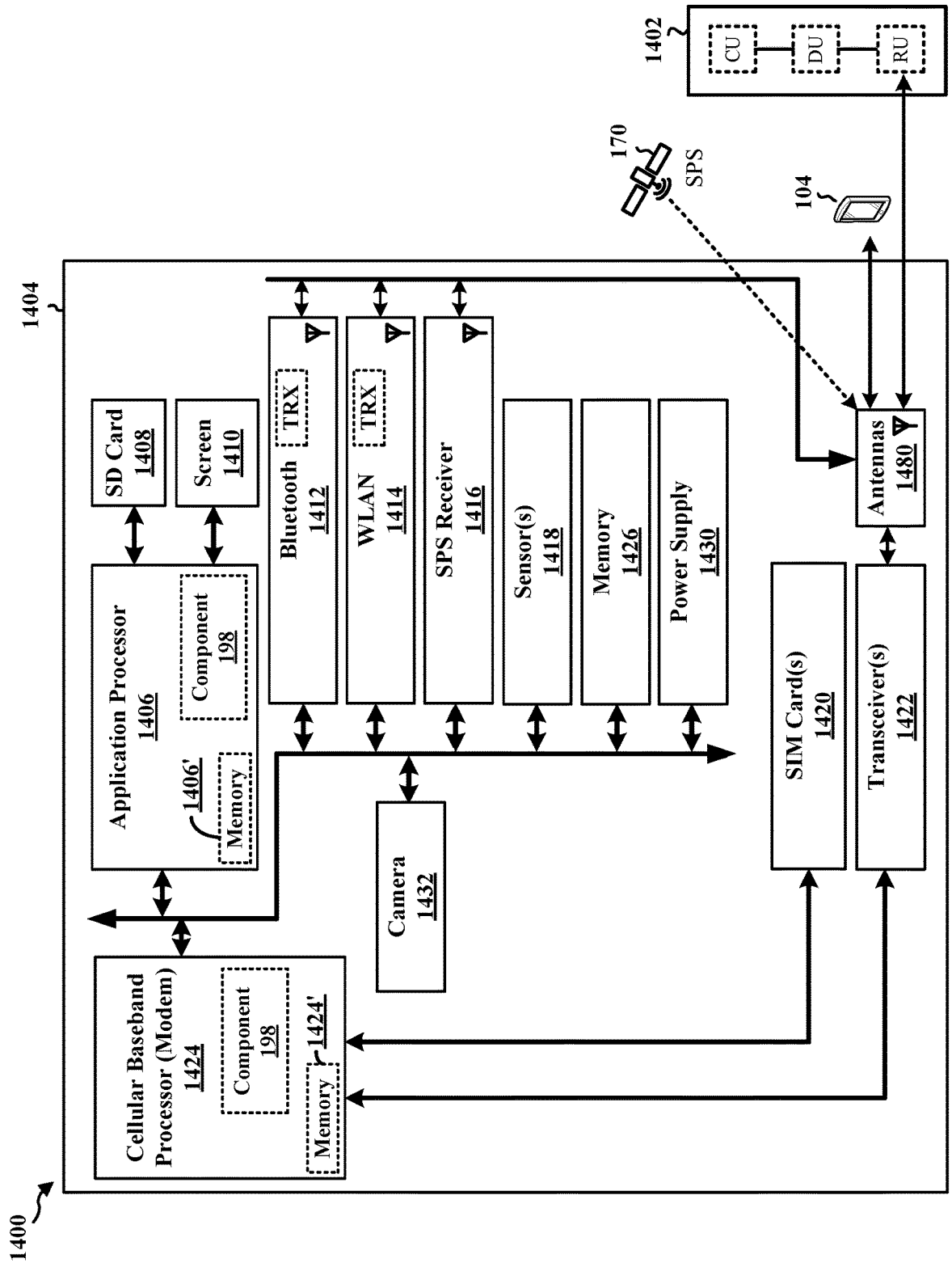
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS receiver 1416 (e.g., GNSS module), one or more sensor modules 1418 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS receiver 1416 may include an on-chip transceiver (TRX) (or in some cases, just a receiver (RX)). The Bluetooth module 1412, the WLAN module 1414, and the SPS receiver 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', additional memory modules 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the Doppler measurement component 198 is configured to receive, via a receiver, signals from one or more entities; determine whether each received signal is a multipath signal based on a Doppler shift measurement; and transmit, via a transmitter, measurement information associated with one or more signals of the received signals, the measurement information indicating at least in part whether each of the one or more signals is a multipath signal. The Doppler measurement component 198 may be within the cellular baseband processor 1224, the application processor 1206, or both the cellular baseband processor 1224 and the application processor 1206. The Doppler measurement component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving, via a receiver, signals from one or more entities; means for determining whether each received signal is a multipath signal based on a Doppler shift measurement; and means for transmitting, via a transmitter, measurement information associated with one or more signals of the received signals, the measurement information indicating at least in part whether each of the one or more signals is a multipath signal.

In one configuration, the means for determining whether each received signal is a multipath signal based on the Doppler shift measurement includes configuring the apparatus 1204 to: measure a Doppler shift of the received signal; and determine whether residual of the measured Doppler shift for the received signal exceeds a threshold Doppler shift, where the received signal is determined to be a multipath signal when the residual of the measured Doppler shift for the received signal exceeds the threshold Doppler shift. In such a configuration, the threshold Doppler shift is equal to an expected Doppler shift plus or minus a Doppler shift range. In such a configuration, the Doppler shift range is a constant value, a function of the measured Doppler shift, a function of a velocity of the UE, a function of the residual of the measured Doppler shift, or a function of an environment of the UE.

In another configuration, the measurement information further indicates the Doppler shift measurement for the one or more signals.

In another configuration, the measurement information is transmitted to a location server.

In another configuration, the multipath signal includes a non-line-of-sight signal.

The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of positioning at a UE, including: receiving, via a receiver, signals from one or more entities; determining whether each received signal is a multipath signal based on a Doppler shift measurement; and de-weighting or excluding one or more signals of the received signals in estimating a position of the UE based on whether the respective received signal is determined to be a multipath signal.

Aspect 2 is the method of aspect 1, where the determining whether each received signal is a multipath signal based on the Doppler shift measurement includes: measuring a Doppler shift of the received signal; and determining whether residual of the measured Doppler shift for the received signal exceeds a threshold Doppler shift, where the received signal is determined to be a multipath signal when the residual of the measured Doppler shift for the received signal exceeds the threshold Doppler shift.

Aspect 3 is the method of aspect 2, where the threshold Doppler shift is equal to an expected Doppler shift plus or minus a Doppler shift range.

Aspect 4 is the method of aspect 3, where the Doppler shift range is a constant value.

Aspect 5 is the method of aspect 3, where the Doppler shift range is a function of the measured Doppler shift.

Aspect 6 is the method of aspect 3, where the Doppler shift range is a function of a velocity of the UE.

Aspect 7 is the method of aspect 3, where the Doppler shift range is a function of an environment of the UE.

Aspect 8 is the method of any of aspects 1 to 7, where the de-weighting or the excluding one or more signals of the received signals in estimating a position of the UE based on whether the respective received signal is determined to be a multipath signal includes: excluding each signal of the one or more signals of the received signals in estimating the position of the UE when the respective signal is determined to be a multipath signal.

Aspect 9 is the method of any of aspects 1 to 8, where the de-weighting or the excluding one or more signals of the received signals in estimating a position of the UE based on whether the respective received signal is determined to be a multipath signal includes: de-weighting by W a measurement of each signal of the one or more signals of the received signals in estimating the position of the UE when the respective signal is determined to be a multipath signal, where $0 \leq W < 1$.

Aspect 10 is the method of aspect 9, where W is based on a difference between the measured Doppler shift and a threshold Doppler shift.

Aspect 11 is the method of aspect 9, where a first number N is equal to a number of the one or more entities, a second number M is equal to a number of transmitters of the one or more entities from which signals are received that are determined to be multipath, and W is based on a comparison of the first number N and the second number M.

Aspect 12 is the method of any of aspects 1 to 11, further including transmitting, via a transmitter, to at least one location server, measurement information or a UE position estimate associated with the de-weighted or the excluded one or more signals.

Aspect 13 is the method of aspect 12, further including transmitting, to the at least one location server, information indicating whether the measurement information or the UE position estimate is associated with one or more multipath signals.

Aspect 14 is the method of any of aspects 1 to 13, where the multipath signal includes a non-line-of-sight signal.

Aspect 15 is the method of any of aspects 1 to 14, wherein the one or more entities include one or more satellites, one or more base stations, or a combination thereof.

Aspect 16 is an apparatus for position estimation for implementing any of aspects 1 to 15.

Aspect 17 is an apparatus for position estimation including means for implementing any of aspects 1 to 15.

Aspect 18 is a computer-readable medium storing computer executable code, where the code when executed by a processor causes the processor to implement any of aspects 1 to 15.

Aspect 19 is a method of positioning at a UE, including: receiving, via a receiver, signals from one or more entities; determining whether each received signal is a multipath signal based on a Doppler shift measurement; and transmitting, via a transmitter, measurement information associated with one or more signals of the received signals, the measurement information indicating at least in part whether each of the one or more signals is a multipath signal.

Aspect 20 is the method of aspect 19, where the determining whether each received signal is a multipath signal based on the Doppler shift measurement includes: measuring a Doppler shift of the received signal; and determining whether residual of the measured Doppler shift for the received signal exceeds a threshold Doppler shift, where the received signal is determined to be a multipath signal when the residual of the measured Doppler shift for the received signal exceeds the threshold Doppler shift.

Aspect 21 is the method of aspect 20, where the threshold Doppler shift is equal to an expected Doppler shift plus or minus a Doppler shift range.

Aspect 22 is the method of aspect 21, where the Doppler shift range is one of: a constant value; a function of the measured Doppler shift; a function of the residual of the measured Doppler shift; a function of a velocity of the UE; or a function of an environment of the UE.

Aspect 23 is the method of any of aspects 19 to 22, where the measurement information further indicates the Doppler shift measurement for the one or more signals.

Aspect 24 is the method of any of aspects 19 to 23, where the measurement information is transmitted to a location server.

Aspect 25 is the method of any of aspects 19 to 24, where the multipath signal includes a non-line-of-sight signal.

Aspect 26 is the method of any of aspects 19 to 25, wherein the one or more entities include one or more satellites, one or more base stations, or a combination thereof.

Aspect 27 is an apparatus for position estimation for implementing any of aspects 19 to 26.

Aspect 28 is an apparatus for position estimation including means for implementing any of aspects 19 to 26.

Aspect 29 is a computer-readable medium storing computer executable code, where the code when executed by a processor causes the processor to implement any of aspects 19 to 26.

What is claimed is:

1. An apparatus of positioning at a user equipment (UE), comprising:
   at least one memory;
   a receiver; and
   at least one processor coupled to the at least one memory and the receiver, the at least one processor is configured to:
     receive, via the receiver, signals from one or more entities;
     determine whether each received signal is a multipath signal based on a Doppler shift measurement; and
     de-weight by W a measurement of each signal in one or more signals of the received signals in estimating a position of the UE when the respective received signal is determined to be the multipath signal, where $0 \leq W < 1$.

2. The apparatus of claim 1, wherein, to determine whether each received signal is the multipath signal based on the Doppler shift measurement, the at least one processor is further configured to:
   measure a Doppler shift of the received signal; and
   determine whether residual of the measured Doppler shift for the received signal exceeds a threshold Doppler shift,
   wherein the received signal is determined to be the multipath signal when the residual of the measured Doppler shift for the received signal exceeds the threshold Doppler shift.

3. The apparatus of claim 2, wherein the threshold Doppler shift is equal to an expected Doppler shift plus or minus a Doppler shift range.

4. The apparatus of claim 3, wherein the Doppler shift range is one of:
  a constant value,
  a function of the measured Doppler shift,
  a function of the residual of the measured Doppler shift,
  a function of a velocity of the UE, or
  a function of an environment of the UE.

5. The apparatus of claim 1, wherein W is based on a difference between the measured Doppler shift and a threshold Doppler shift.

6. The apparatus of claim 1, wherein a first number N is equal to a number of the one or more entities, a second number M is equal to a number of transmitters of the one or more entities from which signals are received that are determined to be multipath, and W is based on a comparison of the first number N and the second number M.

7. The apparatus of claim 1, further comprising a transmitter, wherein the at least one processor is further configured to transmit, via the transmitter, to at least one location server, measurement information or a UE position estimate associated with the de-weighted one or more signals.

8. The apparatus of claim 7, wherein the at least one processor is further configured to transmit, to the at least one location server, information indicating whether the measurement information or the UE position estimate is associated with one or more multipath signals.

9. The apparatus of claim 1, wherein the multipath signal includes a non-line-of-sight (NLOS) signal.

10. The apparatus of claim 1, wherein the one or more entities include one or more satellites, one or more base stations, or a combination thereof.

11. A method of positioning at a user equipment (UE), comprising:
  receiving, via the receiver, signals from one or more entities;
  determining whether each received signal is a multipath signal based on a Doppler shift measurement; and
  de-weighting by W a measurement of each signal in one or more signals of the received signals in estimating a position of the UE when the respective received signal is determined to be the multipath signal, where $0 \leq W < 1$.

12. The method of claim 11, wherein the determining whether each received signal is the multipath signal based on the Doppler shift measurement comprises:
  measuring a Doppler shift of the received signal; and
  determining whether residual of the measured Doppler shift for the received signal exceeds a threshold Doppler shift,
  wherein the received signal is determined to be the multipath signal when the residual of the measured Doppler shift for the received signal exceeds the threshold Doppler shift.

13. The method of claim 12, wherein the threshold Doppler shift is equal to an expected Doppler shift plus or minus a Doppler shift range.

14. The method of claim 13, wherein the Doppler shift range is one of:
  a constant value,
  a function of the measured Doppler shift,
  a function of the residual of the measured Doppler shift,
  a function of a velocity of the UE, or
  a function of an environment of the UE.

15. The method of claim 11, wherein W is based on a difference between the measured Doppler shift and a threshold Doppler shift.

16. The method of claim 11, wherein a first number N is equal to a number of the one or more entities, a second number M is equal to a number of transmitters of the one or more entities from which signals are received that are determined to be multipath, and W is based on a comparison of the first number N and the second number M.

17. The method of claim 11, further comprising:
  transmitting, via a transmitter, to at least one location server, measurement information or a UE position estimate associated with the de-weighted one or more signals; and
  transmitting, to the at least one location server, information indicating whether the measurement information or the UE position estimate is associated with one or more multipath signals.

18. An apparatus for wireless communication at a user equipment (UE), comprising:
  means for receiving, via the receiver, signals from one or more entities;
  means for determining whether each received signal is a multipath signal based on a Doppler shift measurement and
  means for de-weighting by W a measurement of each signal in one or more signals of the received signals in estimating a position of the UE when the respective received signal is determined to be the multipath signal, where $0 \leq W < 1$.

19. A non-transitory computer-readable medium storing computer executable code at a <user equipment (UE), the code when executed by at least one processor causes the at least one processor to:
  receive, via the receiver, signals from one or more entities;
  determine whether each received signal is a multipath signal based on a Doppler shift measurement; and
  de-weight by W a measurement of each signal in one or more signals of the received signals in estimating a position of the UE when the respective received signal is determined to be the multipath signal, where $0 \leq W < 1$.

\* \* \* \* \*